(12) United States Patent
Escobedo et al.

(10) Patent No.: US 10,796,298 B2
(45) Date of Patent: Oct. 6, 2020

(54) INTERACTIVE DISPLAY BASED ON NEAR FIELD COMMUNICATIONS

(71) Applicant: PAYPAL, INC., San Jose, CA (US)

(72) Inventors: Miguel Angel Escobedo, Austin, TX (US); Matthew Wilczynski, Austin, TX (US); Kevin Keith Tijerina, Pflugerville, TX (US); Abraham Doris-Down, Newtonville, MA (US)

(73) Assignee: PayPal, Inc., San Jose, CA (US)

( * ) Notice: Subject to any disclaimer, the term of this patent is extended or adjusted under 35 U.S.C. 154(b) by 201 days.

(21) Appl. No.: 15/701,256

(22) Filed: Sep. 11, 2017

(65) Prior Publication Data

US 2018/0121905 A1    May 3, 2018

Related U.S. Application Data

(63) Continuation of application No. 14/557,269, filed on Dec. 1, 2014, now abandoned.

(51) Int. Cl.
| | | |
|---|---|---|
| *H04L 29/04* | (2006.01) | |
| *G06Q 40/00* | (2012.01) | |
| *G06F 15/00* | (2006.01) | |
| *G06Q 20/32* | (2012.01) | |
| *G06Q 30/06* | (2012.01) | |
| *H04L 29/06* | (2006.01) | |
| *G06F 21/35* | (2013.01) | |

(52) U.S. Cl.
CPC ..... *G06Q 20/3278* (2013.01); *G06Q 30/0635* (2013.01); *G06F 21/35* (2013.01); *H04L 63/08* (2013.01); *H04L 63/0853* (2013.01)

(58) Field of Classification Search
CPC .......... H04W 4/80; H04W 76/10; G06F 21/00
See application file for complete search history.

(56) References Cited

U.S. PATENT DOCUMENTS

2006/0195331 A1*  8/2006  Goldthwaite .......... G06Q 99/00
                                                        345/581
2009/0271727 A1   10/2009  Levy et al.
(Continued)

FOREIGN PATENT DOCUMENTS

| WO | WO 2007/060516 | 5/2007 |
|---|---|---|
| WO | WO 2012/118517 | 9/2012 |
| WO | WO 2013/157996 | 10/2013 |

*Primary Examiner* — Jordany Nunez
(74) *Attorney, Agent, or Firm* — Haynes and Boone LLP

(57) ABSTRACT

Systems and methods for providing interaction between a user device and an interactive display system using near field communications are provided. The interactive display system includes a display panel configured to present visual content and near field communication (NFC) devices behind or within the display panel. The interactive display system detects a user device adjacent to the display panel using at least one of the NFC devices. The interactive display system determines a position relative to the display panel for the user device. The interactive display system exchanges data with the user device based on the position. The interactive display system may receive data that includes displayable information from the user device and present the displayable information on the display panel at or near the position for the user device. The interactive display system may simultaneously interact with more than one user device.

20 Claims, 23 Drawing Sheets

(56) References Cited

U.S. PATENT DOCUMENTS

| | | | |
|---|---|---|---|
| 2010/0271177 A1* | 10/2010 | Pang | G06K 7/10019 340/10.1 |
| 2011/0035445 A1* | 2/2011 | Eickhoff | G06Q 10/10 709/204 |
| 2011/0070837 A1* | 3/2011 | Griffin | H04B 5/0062 455/41.3 |
| 2011/0185607 A1 | 8/2011 | Forster et al. | |
| 2011/0246490 A1* | 10/2011 | Jonsson | H04L 67/12 707/755 |
| 2012/0290336 A1 | 11/2012 | Rosenblatt et al. | |
| 2013/0079037 A1* | 3/2013 | Dobyns | H04W 4/023 455/456.3 |
| 2013/0203444 A1* | 8/2013 | Perry | G06Q 20/3224 455/456.3 |
| 2014/0051354 A1* | 2/2014 | Lee | H04B 5/00 455/41.1 |
| 2014/0087654 A1* | 3/2014 | Kiveisha | H04B 5/0031 455/41.1 |
| 2014/0149033 A1 | 5/2014 | Moosavi et al. | |
| 2014/0165152 A1* | 6/2014 | Farouki | H04L 63/08 726/4 |
| 2014/0191988 A1 | 7/2014 | Corrion | |
| 2014/0278094 A1* | 9/2014 | Stracke, Jr. | G01C 21/3688 701/533 |
| 2015/0201439 A1* | 7/2015 | Park | H04W 76/16 370/338 |
| 2016/0062578 A1* | 3/2016 | Murarka | H04L 51/32 715/828 |

* cited by examiner

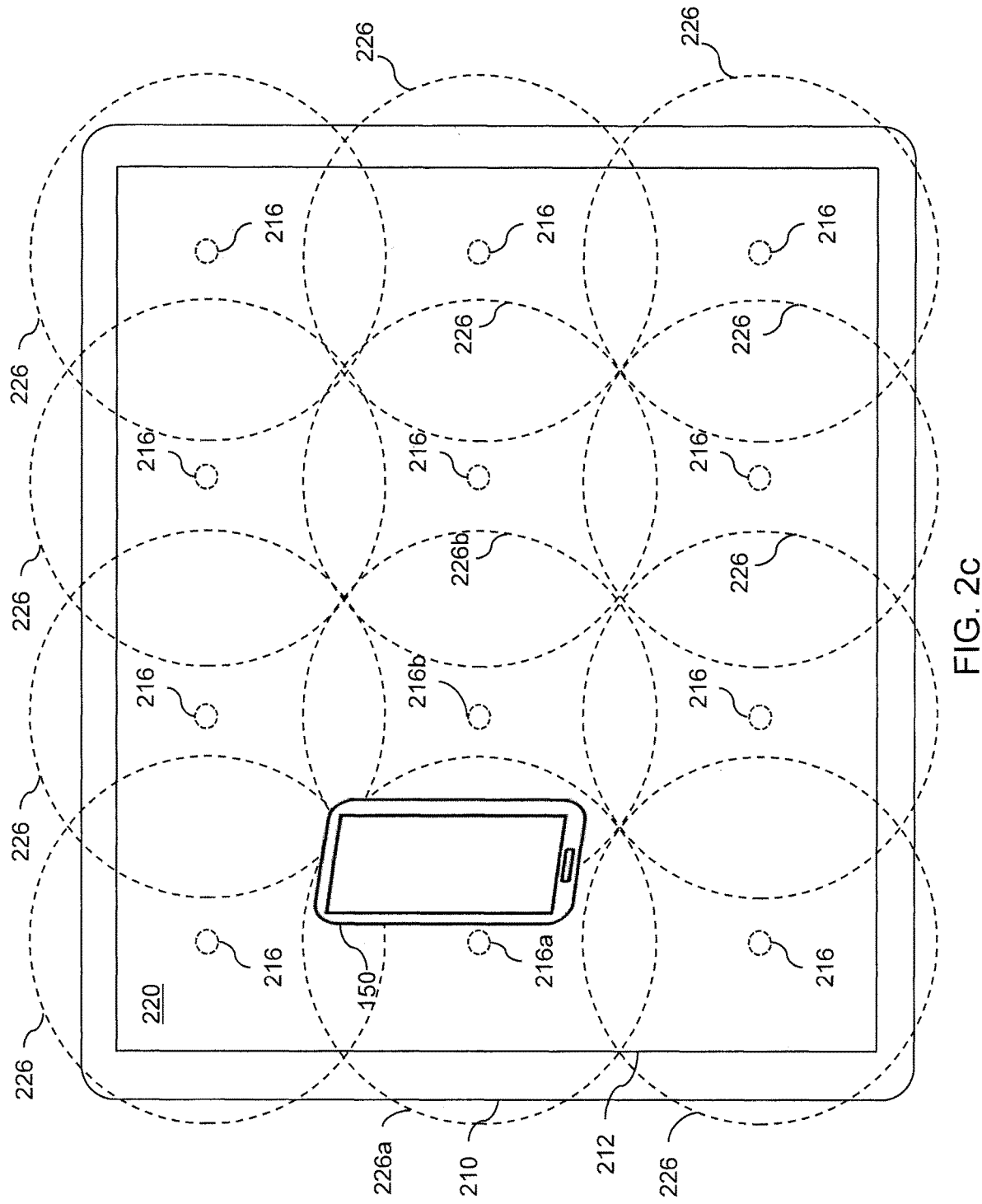

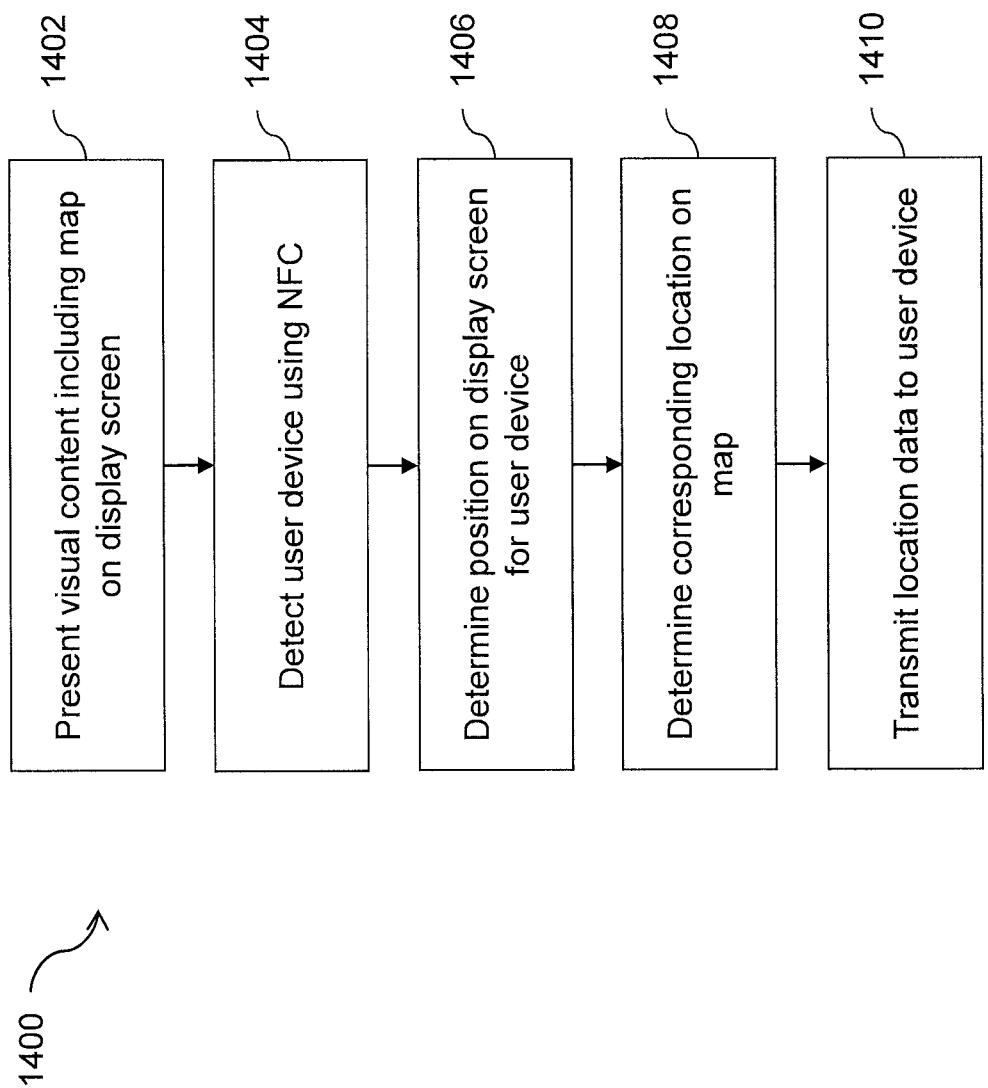

INTERACTIVE DISPLAY BASED ON NEAR FIELD COMMUNICATIONS

CROSS REFERENCED TO RELATED APPLICATIONS

This continuation patent application claims priority to and the benefit of U.S. patent application Ser. No. 14/557,269, filed Dec. 1, 2014, the contents of which are incorporated by reference in its entirety.

BACKGROUND

Field of the Invention

The present invention relates to interactive display systems and, more particularly, to interactive display systems that include near field communication (NFC) devices.

Related Art

Touchscreen display panels allow users to touch the touchscreen display panels to interact with visual content presented. Touch input is typically received by the touchscreen display panel based on capacitive or resistive changes in vertical and horizontal conductive lines, which traverse the display panel, at the location of the touch. However, the information received by the touchscreen display panels is limited to the location of the contact or near contact with the panel, and no information, other than the visual content, is transmitted by the display. Further, touchscreen display panels typically are only able to detect a limited number of points of contact. Thus, even a large touchscreen display panel can typically only interact with a small number of users at one time.

BRIEF DESCRIPTION OF THE FIGURES

FIGS. 2a, 2b, 2c, and 2d are diagrams illustrating various aspects of an interactive display system and a user device adjacent to the interactive display system according to an embodiment of the present disclosure;

FIG. 14 is a flowchart showing an illustrative method for providing location information and/or directions through interaction between a user device and an interactive display system using near field communications according to an embodiment of the present disclosure.

Figure 1:
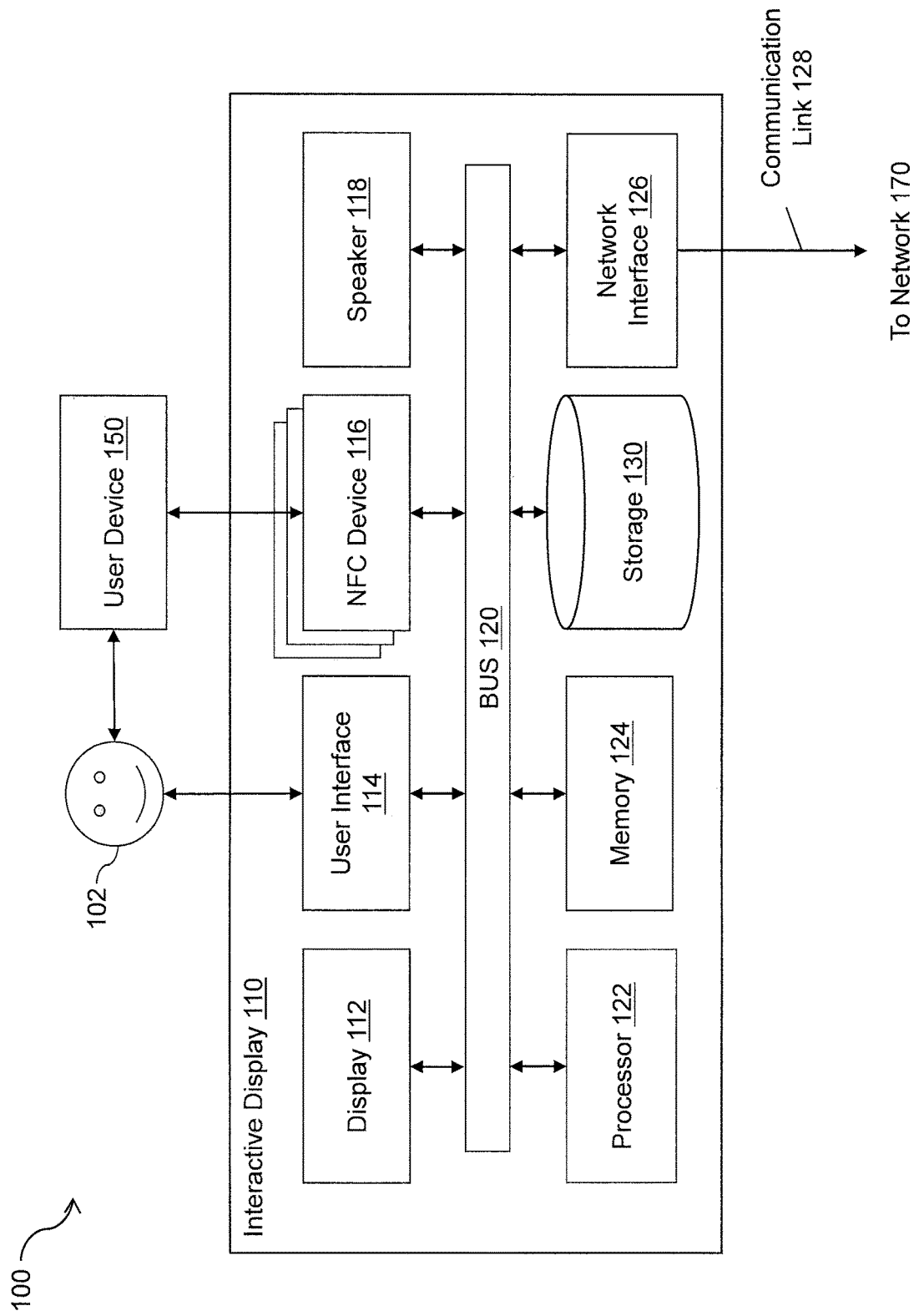
FIG. 1 is a block diagram illustrating a hardware environment supporting an interactive display system that includes near field communication (NFC) devices according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for an interactive display system using near field communications.

An interactive display system may be a system including a display panel and a plurality of near field communication (NFC) devices behind, within, or otherwise disposed on or around the display panel. The NFC devices may be arranged as an array of NFC devices. For example, the NFC devices may be arranged in rows and columns behind or within the display panel. The display panel may present visual content. In an embodiment, the NFC devices allow the interactive display system to sense where an NFC-enabled user device is placed (e.g., position, orientation, movement) relative to the display panel. In further embodiments, the NFC devices are used to synchronize the interactive display system and the user device based on the user device's position and/or movement.

In various embodiments, an interactive display system presents visual content, such as images, text, and videos, on a display panel. The interactive display system detects a user device adjacent to the display panel using at least one of the NFC devices. The interactive display system determines a position relative to the display panel for the user device. The position for the user device may be based on which of the NFC devices detected the user device. The interactive display system then exchanges data with the user device based on the position for the user device. The interactive display system may detect, determine a position for, and exchange data with more than one user device simultaneously using respective more than one NFC devices.

In various embodiments, the visual content presented on the display panel may be changed, modified, or updated based on the data and/or the position for the user device. The interactive display system may receive data that includes displayable information from the user device. The interactive display system may present the displayable information on the display panel at or near the position for the user device based on the received data.

In an embodiment, the interactive display system is at a location or event where users may check-in (e.g., a conference, a seminar, a meeting, a wedding, a convention, a movie theater, a concert, an airport, a stadium, a hotel, etc.). The interactive display system presents representations of users including names of users (e.g., names of attendees, guests, participants, passengers, etc.). A user may place a user device in front of a name. The interactive display system detects the user device with one or more of the NFC devices and determines a position relative to the display panel for the user device based on which of the NFC devices detected the user device. The interactive display system determines the name based on the position and receives user data from the user device. The interactive display system may authenticate the user by determining that the user data and the name are associated with (e.g., belong to) the same user. The interactive display system may then check in the user based on the user data and/or the authentication. In other embodiments, in addition to or in place of the names of the users, the representation of users may include pictures of users, seat numbers, usernames, registration numbers, and/or other user representations.

In an embodiment, an interactive display system is at a location or event with items, such as goods and/or services, for sale (e.g., a merchant such as a clothing store, an electronics store, a restaurant, a café, etc.), for viewing (e.g., a museum, an exhibition, etc.), or for loaning (e.g., a library, a movie rental, etc.). The interactive display system presents the items on a display panel. A user may place a user device in front of an item. The interactive display system detects the user device and determines a position relative to the display panel for the user device based on which of the NFC devices detected the user device. The interactive display system determines the item based on the position and transmits item data for the item to the user device. Item information may be presented on the user device in response to receiving the item data. In certain embodiments in which the items are for sale, the interactive display system may function as a point of sale and allow the user to purchase the item. An option to purchase the item is presented on the user device in response to receiving the item data. A user may select to purchase the item on the user device. The interactive display system may receive purchase request data and payment data for the item from the user device (e.g., via NFC communications with the user device), and may transmit such data to a payment service provider server for payment processing.

In an embodiment, an interactive display system presents a map on a display panel (e.g., a map of a mall, a convention center, an airport, a building, a city, a park, etc.). A user may place a user device in front of a map location, which represents a physical location. The interactive display system detects the user device and determines a position relative to the display panel for the user device based on which of the NFC devices detected the user device. The interactive display system determines the map location based on the position and transmits location data for the map location to the user device. Information relating to the physical location (e.g., attractions, amenities, stores, etc., at the physical location) and/or directions from the current location to the physical location may be presented on the user device in response to receiving the location data.

In further embodiments, a user may use a user device to further transmit data relating to the map location. The interactive display system receives such data and may present information on the map based on the received data, or in turn transmit the received data to relevant parties. In an example, a parent who is missing a child may place a user device at the location where the parent last saw the child and transmit data including missing child information and/or a picture of the child. The interactive display system may present a missing child message, which may include the missing child information and the picture, on the map for others to view. The interactive display system may transmit the data to relevant authorities, such as security personnel or law enforcement.

In an embodiment, an interactive display system presents a message board including messages (e.g., a text message, a picture, a video, etc.). In an example, the message board may be for advertisements, job postings, rental listings, classifieds, etc. In another example, the message board may be a crisis message board to post information relating to a crisis (e.g., a natural disaster, military conflict, terrorist attack, etc.). A user may place a user device in front of a message board location. The interactive display system detects the user device and determines a position relative to the display panel for the user device based on which of the NFC devices detected the user device. The interactive display system determines the message board location based on the position. The user may post a message on the message board using the user device by sending message data for the message. The interactive display system receives the message data and presents the message on the message board location. The user or another user may place his or her device in front of the same message board location and update or delete the message. In other embodiments, the user may also download a previously posted message onto the user device by receiving message data for the posted message. The interactive display system transmits message data for the posted message to the user device, and the posted message may be stored on the user device. In further embodiments, the user may select to be updated on the user device when the message is updated. In an example, the message board may be utilized after a natural disaster. Users may post messages (e.g., searching for a missing person, status regarding rescue efforts, etc.) and may further store messages on their user devices, which may be automatically updated in real-time (e.g., that the missing person was found, progress of rescue efforts, etc.).

Referring now to FIG. 1, a block diagram 100 of a hardware environment of an exemplary interactive display system 110 is illustrated. Interactive display system 110 may include a bus 120 or other communication mechanism for communicating data, which interconnects subsystems and components, including a display panel 112, a user interface 114, a plurality of NFC devices 116, speakers 118 (or alternatively, an audio interface to connect to external speakers), one or more processing components 122 (e.g., a processor, a micro-controller, a digital signal processor (DSP), etc.), a system memory component 124 (e.g., RAM), a storage component 130 (e.g., a static storage drive such as ROM), and a network interface circuit 126.

Display panel 112, in various embodiments, is configured to present visual content. Display panel 112 may include a pixel array. Each pixel may be manipulated and have an address corresponding to its physical coordinates. Display panel 112 may be a light-emitting diode (LED) display panel, organic light-emitting diode (OLED) display panel, liquid-crystal (LCD) display panel, plasma display panel (PDP), cathode ray tube (CRT) display panel, or other display panel. Display panel 112 may be flat or curved, and may have a rectangular shape, round shape, or other shape. In some embodiments, display panel 112 may include a touchscreen component.

A user 102 may interact with interactive display system 110 using user interface 114. User interface 114, in an embodiment, may include an input component, such as a touchscreen (e.g., touchscreen component of display panel 112), a remote control, a keyboard, or other input component. In an embodiment, user interface 114 may be provided, at least in part, by a graphic user interface (GUI) provided on display panel 112 or a user device 150. In other embodiments, user interface 114 includes a remote control. User 102 may provide input on the remote control, and the remote control may transmit the user input via infrared or near-infrared signals to the interactive display system 110. User interface 114 may provide a menu or settings on display panel 112, and user 102 may interact with the menu or settings using the remote control.

NFC devices 116, in various embodiments, are each located at a corresponding position behind, within, in front of, along the edges of, or otherwise disposed on, in, or around display panel 112. NFC devices 116 may be located at various positions relative to the display such that NFC devices 116 are capable of exchanging data with user devices 150 adjacent to display panel 112. The plurality of NFC devices 116 may include an array of NFC devices arranged in rows and columns that span display panel 112. However, this is merely exemplary and the array of NFC devices may be arranged in any shape and/or may cover a part of display panel 112.

NFC devices 116, in various embodiments, include an NFC transceiver circuitry and/or an NFC antenna. NFC devices may communicate using magnetic fields or electric fields, and may implement standards such as ECMA-340 (NFCIP-1), ECMA-352 (NFCIP-2), ISO/IEC 18092, ISO/IEC 21481, ISO/IEC 14443A, ISO/IEC 14443B, ISO/IEC 15693, JIS X6319-4, and FeliCa. However, it is contemplated that other short-range wireless communication technologies and standards (e.g., radio-frequency identification (RFID), Bluetooth low energy, etc.) may be utilized and fall within the scope of the present disclosure. One of ordinary skill in the art will recognize that the use of near field communication between NFC device 116 and user devices 150 may be advantageously utilized to provide for low power communication, and also provide a more secure communication due to its short range.

Each NFC device 116, in various embodiments, is configured to detect user device 150 adjacent to display panel 112, such as in front of display panel 112, when user device 150 is within the range of NFC device 116 (e.g., within 2 cm, within 5 cm, within 10 cm, within 20 cm, etc.). Each NFC device 116 may create a communication area in which user device 150 is detected. The communication area may cover, for example, a spherical region on and around display panel 112. When user device 150 is placed in the communication area of NFC device 116, NFC device 116 may detect user device 150 and exchange data with user device 150.

NFC device 116 may receive identifier data packets from user device 150. The identifier data packets may include one or more user identifiers, which may be operating system registry entries, cookies associated with a user interface application, identifiers associated with hardware of user device 150, or various other appropriate identifiers. The user identifiers may be used to identify user device 150, user 102, or a user account associated with user device 150 or user 102. NFC device 116 may further exchange data and information with user device 150. In some embodiments, NFC device 116 may communicate with user device 150 without receiving an identifier of user device 150 or user 102.

In accordance with embodiments of the present disclosure, interactive display system 110 performs specific operations by processor or processing component 122 executing one or more sequences of one or more instructions contained in system memory component 124. Such instructions may be read into system memory component 124 from another computer readable medium, such as storage component 130. These may include instructions, for example, to operate NFC devices 116 to detect one or more user devices within its respective communication area, determine a position on display panel 112 for user device 150, and operate NFC devices 116 to exchange data with user device 150. In other embodiments, hard-wired circuitry may be used in place of or in combination with software instructions for implementation of one or more embodiments of the disclosure.

Storage component 130, in various embodiments, is configured to store an address for each NFC device 116, which may correspond to its physical coordinates and/or an area (e.g., a communication area). In other embodiments, storage component 130 may store associations between each NFC device 116 (or NFC device address) and pixels and/or a visual content area on display panel 112 (or pixel addresses) that are at, or within the vicinity of (e.g., within a communication area), each NFC device. Storage component 130 may also contain one or more databases for storing user data and information, such as personal information (e.g., user login, user's age, user's location, etc.), user account information, user interest data, sensor data (e.g., sensor data from sensors of user device 150), and other user data and information.

Processor 122, in various embodiments, detects user device 150 using NFC devices 116 and determines a position for user device 150 based on which of NFC device or devices 116 detect user device 150. The position may enclose pixels of display panel 112, and processor 122 may determine which pixels are within the position and/or what visual content is being presented by those pixels based on the address of NFC device 116 and the pixel addresses.

Interactive display system 110 further includes network interface circuit 126 coupled to a network 170. Interactive display system 110 may transmit and receive data, information, messages, and instructions, including one or more programs (i.e., application code), through network interface circuit 126 and a communication link 128. Interactive display system 110 may further include other components, such as an audio/visual (A/V) interface to receive A/V signals via the A/V interface.

Figure 2A:
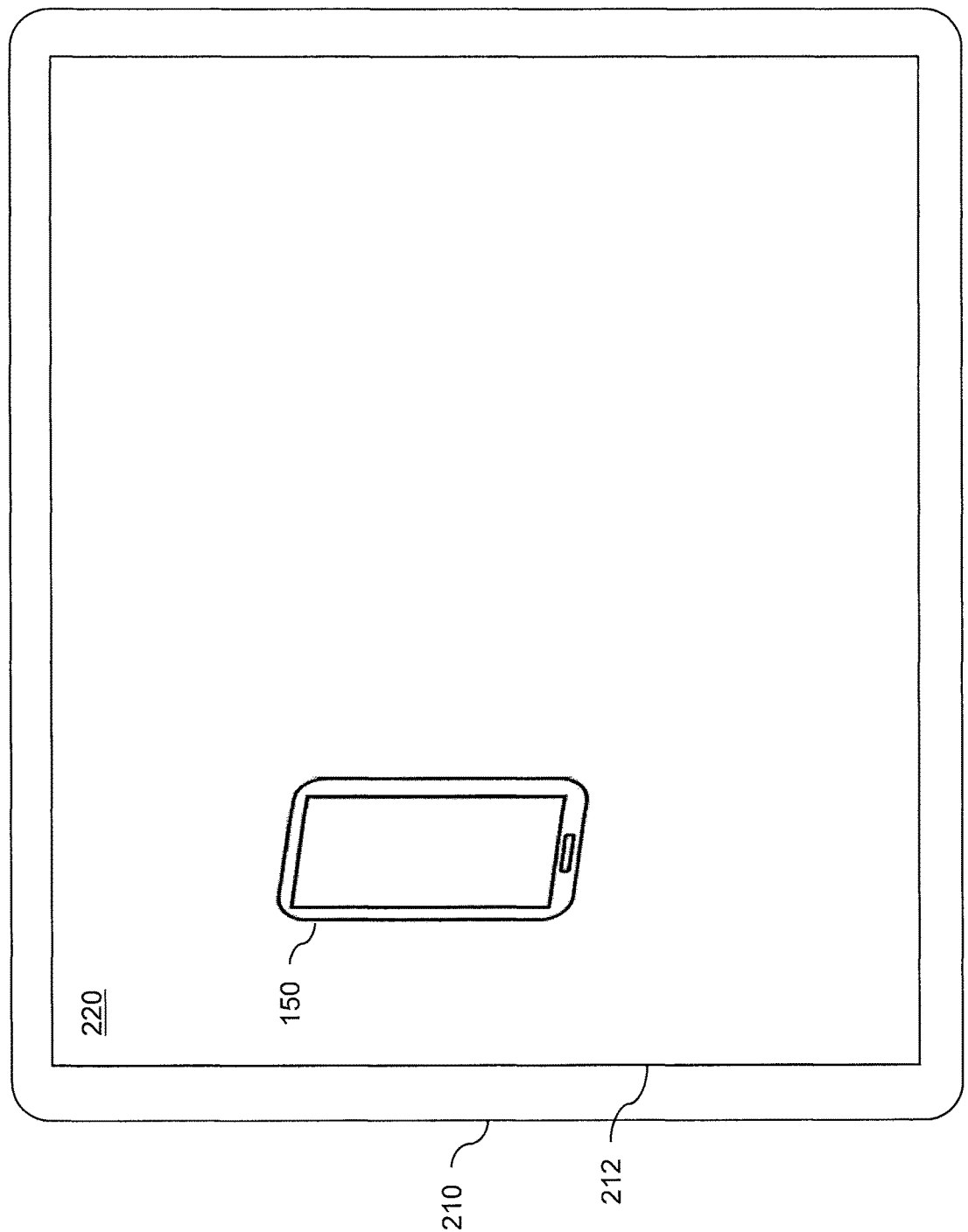

Referring now to FIG. 2a, a diagram of an interactive display system 210 and user device 150 adjacent to interactive display system 210 is illustrated. Interactive display system 210, which may be an implementation of interactive display system 110, includes a display panel 212 configured to present visual content 220.

Figure 2B:
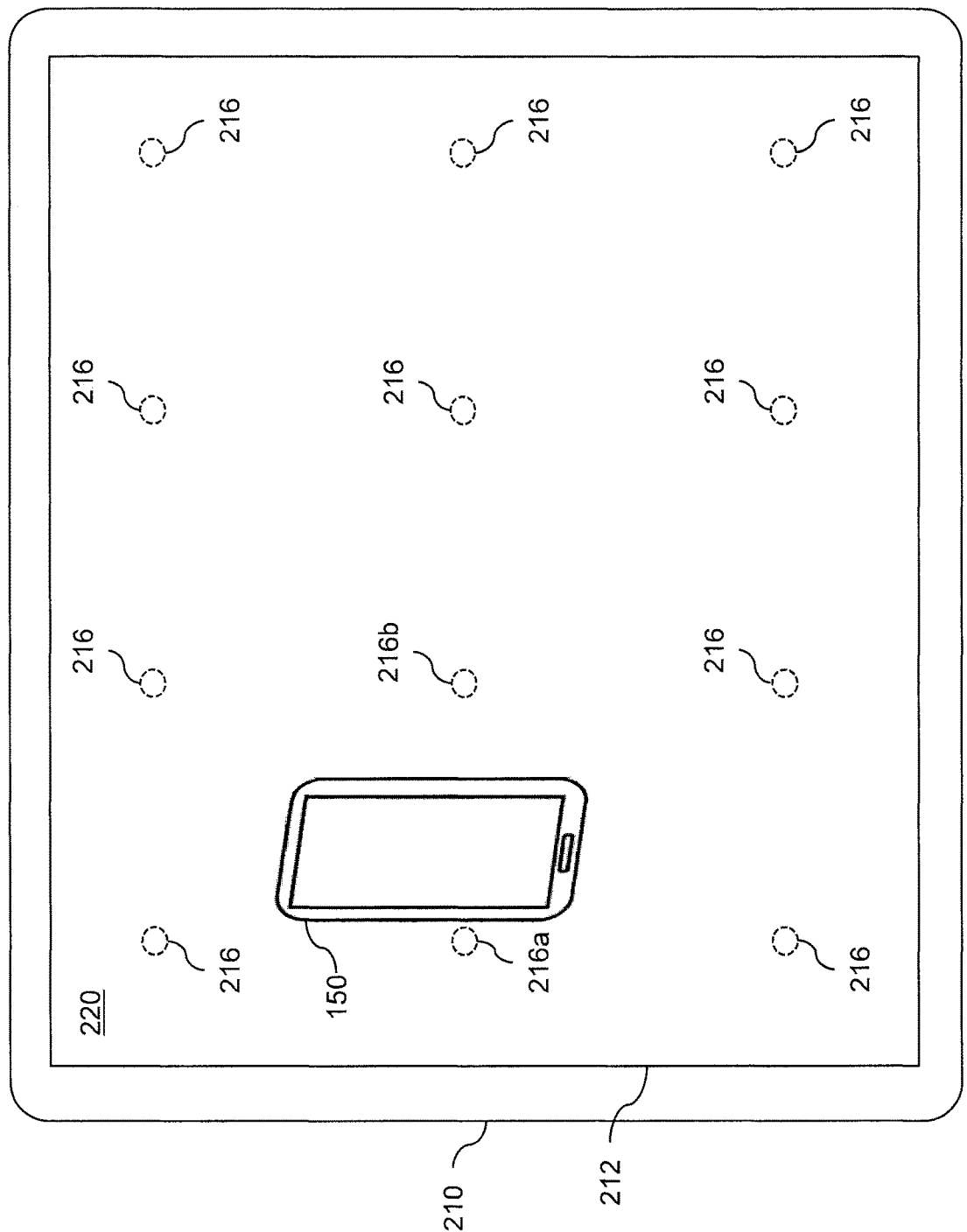

Referring now to FIG. 2b, a diagram showing a plurality of NFC devices 216 located behind or within display panel 212 of an interactive display system 210 is illustrated. Dashed lines are used for NFC devices 216 to show that NFC device 216 may be disposed behind or within the display panel 212 and NFC devices 216 may not be visible (as in FIG. 2a). An array of NFC devices 216 arranged in rows and columns is illustrated. However, NFC devices 216 may be arranged in other patterns or shapes according to the implementation. For example, interactive display system 210 may be used to display a map, and NFC device 216 may be located at positions corresponding to points of interest, pathways, roadways, bridges, or other map features.

Referring now to FIG. 2c, a diagram showing communication areas 226 of respective NFC devices 216 of an interactive display system 210 is illustrated. Dashed lines are used for communication areas 226 to indicate that communication areas 226 may not be visible (as in FIG. 2a). In various embodiments, communication areas 226 are regions in the vicinity of respective NFC devices 216, such as an area enclosed by a range of a respective NFC device 216. NFC devices 216 may have a predetermined range (e.g., 2 cm, 5 cm, 10 cm, 20 cm, etc.). The range of NFC devices 216 may be configured depending on how compacted or spread apart NFC devices 216 are arranged from each other. Interactive display device 210 may detect user device 150 and determine a position for user device 150 based on which of NFC devices 216 detects user device 150.

Figure 2D:
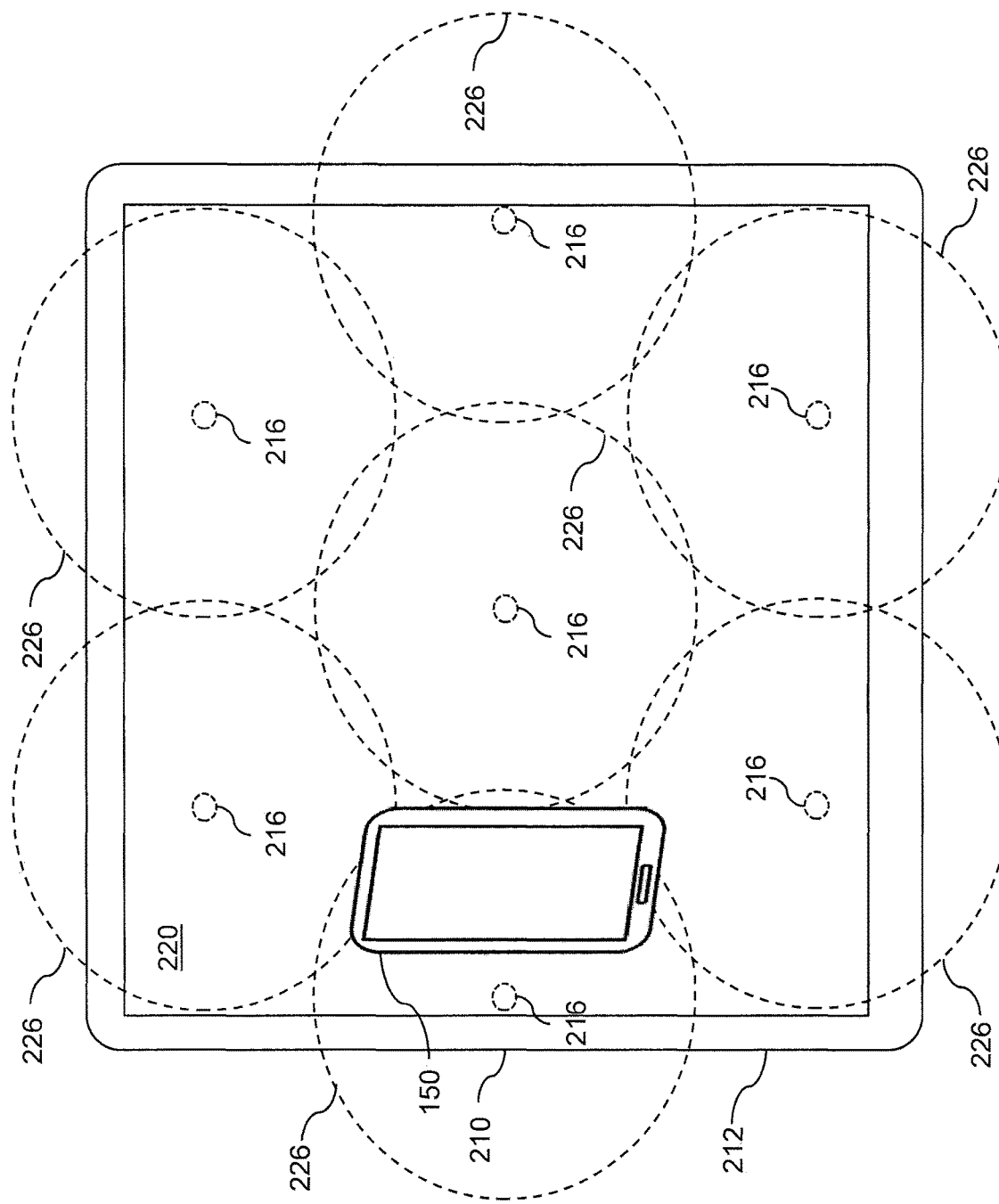

In some embodiments, the position is based on user device 150 communicating with a single one of NFC devices 216. For example, interactive display system 210 may determine NFC device 216a is detecting user device 150 and determine, based on that communication, that user device 150 is in communication area 226a. The position may be determined to be, for example, the position of NFC device 216a, an area around NFC device 216a, and/or communication area 226a. In embodiments in which the position for user device 150 is determined using a single NFC device 216, it may be advantageous to reduce the likelihood of user device 150 being placed within more than one communication area 226 by arranging NFC devices 216 to reduce overlap between communication areas 226 and/or by reducing the range of each NFC device 216. For example, FIG. 2d provides a diagram showing NFC devices 216 arranged to minimize overlap of communication areas 226 by using a hexagonal pattern of NFC devices 216.

In other embodiments, the position of user device 150 may be determined based on user device 150 communicating with one or more NFC devices 216. For example, interactive display system 210 may determine that NFC devices 216a and 216b are both detecting user device 150 and determine that user device 150 is in an overlapping area of communication area 226a and communication area 226b. The position may be determined to be, for example, a position between NFC device 216a and NFC device 216b, an area located between NFC device 216a and NFC device 216b, and/or an overlapping area of communication area 226a and communication area 226b. In embodiments in which the position may be determined using more than one NFC devices 216, it may be advantageous to have overlapping areas in which user device 150 is within more than one communication area 226. NFC devices 216 may be arranged to have optimal overlap between communication areas 226 for better localization of user device 150.

In certain embodiments, further localization techniques may be implemented to determine the position for user device 150. For example, further NFC-based localization techniques (e.g., using NFC tags, triangulation, etc.) may be used. In another example, localization of user device 150 may be based on capacitive sensing, such as by using a capacitive touchscreen display panel. Accordingly, user 102 may be able to interact with interactive display system 210 using user device 150 and touching display panel 212, and the position may be based on where user 102 touches display panel 212. In a further example, motion sensors may be located in relation to display panel 212 such that the motion sensors can detect where user 102 has placed user device 150.

Figure 3:
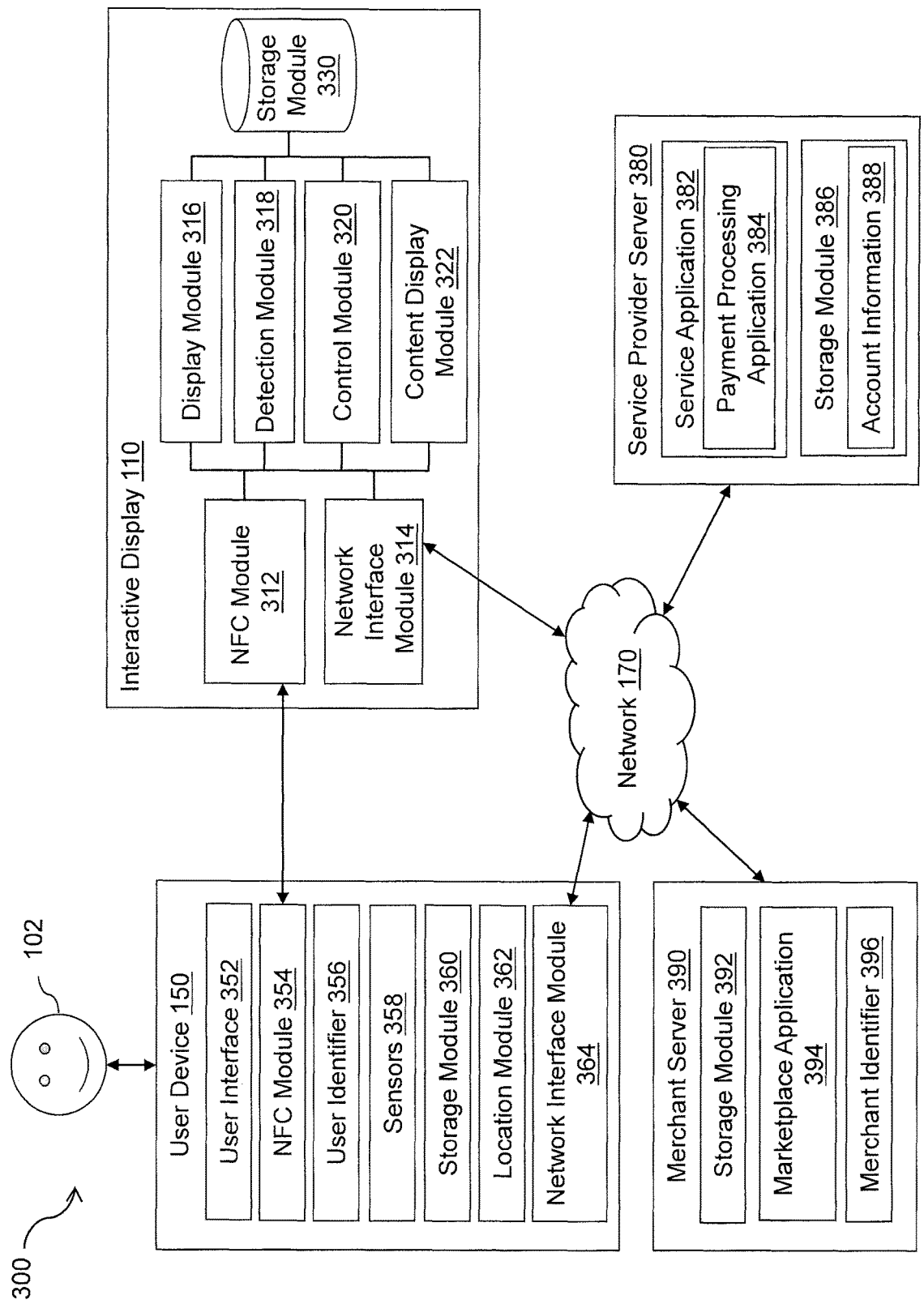
FIG. 3 is a block diagram illustrating a networked system according to an embodiment of the present disclosure.

Referring now to FIG. 3, an embodiment of a network-based system 300 for implementing one or more processes described in the present disclosure is illustrated. As shown, network-based system 300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 300 illustrated in FIG. 3 includes interactive display system 110, one or more NFC-enabled user devices 150 (e.g., a mobile phone, a smartphone, a wearable device, etc.), one or more service provider servers or devices 380 (e.g., network server devices), and one or more merchant servers or devices 390 in communication over network 170. Network 170, in one embodiment, may be implemented as a single network or a combination of multiple networks. For example, in various embodiments, network 170 may include the Internet and/or one or more intranets, landline networks, wireless networks, and/or other appropriate types of communication networks. In another example, network 170 may comprise a wireless telecommunications network (e.g., cellular phone network) adapted to communicate with other communication networks, such as the Internet. As such, in various embodiments, interactive display system 110, user device 150, service provider server 380, and merchant server 390 may be associated with a particular link (e.g., a link, such as a URL (Uniform Resource Locator) to an IP (Internet Protocol) address).

Interactive display system 110, in various embodiments, includes NFC modules 312 configured to be communicatively coupled to user device 150 (e.g., via an NFC module 354 of user device 150) and a network interface module 314 that is communicatively coupled to network 170. NFC modules 312 and network interface module 314 may be communicatively coupled to any or all of a display module 316, a detection module 318, a control module 320, and a content display module 322, any of which may be coupled to a storage module 330. Any or all of the modules may be implemented as a subsystem of interactive display system 110 including a circuit, a hardware component, a hardware subcomponent, and/or a variety of other subsystems known in the art. For example, any or all of the modules 312, 314, 316, 318, 320, 322, and 330 may be implemented using any or all of the hardware components described in FIG. 1. Furthermore, any or all of the modules may be preconfigured to perform their disclosed functionality, or may be configured by a processing system "on-the-fly" or as needed to perform their disclosed functionality. As such, any or all of the modules may include pre-configured and dedicated circuits and/or hardware components, or may be circuits and/or hardware components that are configured as needed.

For example, any or all of the modules may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules to perform the functions described below. As such, in some embodiments, preconfigured and dedicated circuits may be implemented to perform the functions of the modules. In other embodiments, a processing system may execute instructions on a non-transitory, computer-readable medium to configure one or more circuits as needed to perform the functions of the modules.

NFC modules 312 may be included as a separate module provided in interactive display system 110, or may include communications hardware (e.g., antennas) and instructions stored on a computer-readable medium that, when executed by a processing system in interactive display system 110, configure NFC modules 312 to operate the communications hardware to detect user device 150 and exchange data packets and information with user device 150, as well as provide any of the other functionality that is discussed herein. In an embodiment, NFC modules 312 may be implemented, at least in part, as NFC devices 116 in FIG. 1. Network interface module 314 may be included as a separate module provided in interactive display system 110, or may include communications hardware (e.g., antennas) and instructions stored on a computer-readable medium that, when executed by a processing system in interactive display system 110, configure network interface module 314 to operate the communications hardware to send and receive information over network 170, as well as provide any of the other functionality that is discussed herein. In an embodiment, network communication module 314 may be implemented, at least in part, as network interface circuit 126 in FIG. 1.

Display module 316 may be included as a separate module provided in interactive display system 110, or may include display hardware and instructions stored on a computer-readable medium that, when executed by a processing system in interactive display system 110, configure display module 316 to operate the display hardware to display visual content on a display panel, such as display panel 112, as well as provide any of the other functionality that is discussed herein. In an embodiment, display module 316 may include display panel 112 in FIG. 1, as well as other hardware and software components relating to displaying visual content.

Detection module 318 may be included as a separate module provided in interactive display system 110, or may be provided using instructions stored on a computer-readable medium that, when executed by a processing system in interactive display system 110, configure detection module 318 to detect user device 150 adjacent to display panel 112 using at least one NFC module 312, and determine a position for user device 150 relative to display panel 112, as well as provide any of the other functionality that is discussed herein. Control module 320 may be included as a separate module provided in interactive display system 110, or may be provided using instructions stored on a computer-readable medium that, when executed by a processing system in interactive display system 110, configure control module 320 to determine visual content to be presented on display panel 112, exchange data with user device 150 based on the position using the at least one NFC module 312, and change visual content based on the exchanged data and the position, as well as provide any of the other functionality that is discussed herein. Content display module 322 may be included as a separate module provided in interactive display system 110, or may be provided using instructions stored on a computer-readable medium that, when executed by a processing system in interactive display system 110, configure content display module 322 to receive, process, and/or generate visual content data for visual content to be presented on display panel 112, and provide the visual content data to display module 316, as well as provide any of the other functionality that is discussed herein.

Other modules discussed herein but not illustrated in FIG. 3 may be provided as separate modules on interactive display system 110, or using instructions stored on a computer-readable medium similarly as discussed above. While storage module 330 has been illustrated as located in interactive display system 110, one of skill in the art will recognize that it may include multiple storage modules and may be connected to other modules through network 170 without departing from the scope of the present disclosure. In an embodiment, storage module 330 may be implemented as storage component 130 in FIG. 1.

User device 150, in various embodiments, may be utilized by user 102 to interact with interactive display system 110 using near field communications. User device 150 may also be utilized by user 102 to interact with service provider server 380 and/or merchant server 390 over network 170. User device 150 may be implemented using any appropriate combination of hardware and/or software configured for near field communications with other NFC-enabled devices, and for wired and/or wireless communication over network 170. In various embodiments, user devices 150 may include at least one of a smartphone, wireless cellular phone, satellite phone, tablet, laptop computer, notebook computer, hybrid/convertible computer, and/or other types of mobile computing devices. In other embodiments, user devices 150 may include at least one of a wearable device, such as an activity tracker (which may also be called a fitness tracker and/or health tracker), smartwatch, eyeglasses with appropriate computer hardware resources, and/or other types of wearable computing devices. User devices 150 may include a user interface 352, NFC module 354, one or more user identifiers 356, one or more sensors 358, a storage module 360, a location module 362, a network interface module 364, and other modules.

In various implementations, user 102 is able to input data and information into an input component (e.g., a touchscreen, a keyboard, a microphone, etc.) of user device 150 to provide personal information, user interest information, user identification information, and other user data and/or information.

User interface application 352, in an embodiment, may be utilized by user 102 to access applications, to view data or information on a display, and to conduct transactions (e.g., shopping, purchasing, bidding, etc.) with service provider server 380 and/or merchant server 390 over network 370. In one aspect, user 102 may login to an account related to user 102 and purchase expenses may be directly and/or automatically debited from the account via user interface application 352.

In one implementation, user interface application 352 comprises a software program, such as a graphical user interface (GUI), executable by a processor that is configured to interface and communicate with service provider server 380 via network 170. In another implementation, user interface application 352 comprises a browser module that provides a network interface to browse information available over network 170. For example, user interface application 352 may be implemented, in part, as a web browser to view information available over network 170.

In an example, user 102 is able to access merchant websites via one or more merchant servers 390 to view and select items for purchase, and the user 102 is able to purchase items from one or more merchant servers 390 via service provider server 380. Accordingly, in one or more embodiments, user 102 may conduct transactions (e.g., purchase and provide payment for one or more items) from one or more merchant servers 390 via service provider server 180.

User device 150, in various embodiments, may include other applications as may be desired in one or more embodiments of the present disclosure to provide additional features available to user 102. In one example, such other applications may include security applications for implementing client-side security features, programmatic client applications for interfacing with appropriate application programming interfaces (APIs) over network 170, and/or various other types of generally known programs and/or software applications. In still other examples, the other applications may interface with user interface application 352 for improved efficiency and convenience.

NFC module 354, in an embodiment, is configured to communicate with other devices using near field communications. User device 150 may communicate with interactive display system 110 by NFC module 354 of user device 150 exchanging data packets with NFC module 312 of interactive display system 110.

User identifiers, such as user identifier 356, in an embodiment, may be implemented, for example, as operating system registry entries, cookies associated with user interface application 352, identifiers associated with hardware of user device 150, or various other appropriate identifiers. User identifier 356 may include one or more attributes related to user 102, such as personal information related to user 102 (e.g., one or more of names, user names, passwords, photograph images, biometric IDs, addresses, phone numbers, social security number, etc.), banking information, financial information, and/or funding source information (e.g., one or more banking institutions, credit card issuers, user account numbers, security data and information, etc.). In various embodiments, identifier data packets that include user identifier 356 may be transmitted from user device 150 (e.g., via NFC module 354) to interactive display system 110 (e.g., via NFC module 312). In other embodiments, identifier data packets that include user identifier 356 may be transmitted with a user login request (e.g., user login data packets) to service provider server 380 via network 170, and service provider server 380 may use the identifier data packets to associate user 102 with a particular user account maintained by service provider server 380.

Sensors 358, in an embodiment, may include an accelerometer, a gyroscope, one or more cameras, and other sensors. An accelerometer that measures acceleration and a gyroscope that measures orientation may be used together to measure movement and/or orientation of user device 150. A camera may be back-facing such that the camera faces display panel 112 when user 102 places user device 150 in front of display panel 112. The camera may be used to measure distance from display panel 112 and/or localize user device 150 in relation to display panel 112. Sensors 358 may generate sensor data in response to the measurements. A processor of user device 150 may receive the sensor data by accessing and/or communicating with sensors 358. The processor may process, analyze, infer from, and/or interpret the sensor data to generate further sensor data.

Storage module 360, in an embodiment, may store data and information. Storage module 360 may contain one or more databases in which to store the data and information. User device 150 may locally store user account information and/or sensor data in a database on storage module 360.

Location module 362, in various embodiments, determines, tracks, monitors, and/or provides an instant geographical location of user device 150. In one implementation, the geographical location may include GPS coordinates, zip-code information, area-code information, street address information, and/or various other generally known types of location data or information. In various embodiments, location data may be automatically obtained and/or provided by user device 150 via an internal or external monitoring component, such as global positioning system (GPS), which uses satellite-based positioning, assisted GPS (A-GPS), which uses cell tower information to improve reliability and accuracy of GPS-based positioning, and Wi-Fi-based positioning. In other embodiments, location data may be obtained based on communications between user device 150 and a device at the location, such as interactive display system 110 in FIG. 1 (e.g., via NFC device 116) or a check-in device (e.g., a beacon device). This may help to save battery life and allow for better indoor location. In further embodiments, location information may be directly entered into user device 150 by user 102 via a user input component, such as a keyboard, touch display, and/or voice recognition microphone.

Network interface module 364, in various embodiments, communicates with other devices or servers over network 170. For example, user device 150 may communicate with interactive display system 110, service provider server 380, and merchant server 390 via network interface module 364 exchanging data packets with a network interface module of respective devices or servers over network 170.

In one aspect, when interfacing with user device 150, user 102 may elect and/or consent to provide personal information, user interest data, sensor data, location data, and/or other user data or information to service provider server 380 and/or merchant server 390. User 102 may set or configure the user settings/configuration menu of user interface application 352 of user device 150. Through the user settings/configuration menu, user 102 may provide consent to share user data or information and the extent of shared user data or information. User device 150 may transmit shared user data or information dynamically by push synchronization, periodically, or each time an application associated with service provider server 380 or merchant server 390 is opened by user 102. In some embodiments, user 102 may be prompted for permission to release user data or information. Accordingly, user 102 may have exclusive authority to allow transmission of personal information, user interest data, sensor data, and/or location data from user device 150 to service provider server 380 and/or merchant server 390.

Service provider server 380, in one embodiment, may be maintained by a service provider, such as an online service provider or a transaction processing entity that provides processing for financial transactions and/or information transactions between user 102 and one or more of merchant servers 390. As such, service provider server 380 includes a service application 382, which may be adapted to interact with user device 150 over network 170 to facilitate the searching, selection, purchase, and/or payment of items by user 102 from one or more merchant servers 390. In one example, service provider server 380 may be provided by PayPal® Inc. or eBay® Inc. in San Jose, Calif., USA, and/or one or more financial institutions or a respective intermediary that may provide multiple point of sale devices at various locations to facilitate transaction routings between merchants and, for example, financial institutions.

Service application 382, in one embodiment, utilizes a payment processing application 384 to process purchases and/or payments for financial transactions between user 102 and each of merchant servers 390. In one implementation, payment processing application 384 assists with resolving financial transactions through validation, delivery, and settlement. As such, service application 382 in conjunction with the payment processing application 384 settles indebtedness between user 102 and each of merchant servers 390, wherein accounts may be directly and/or automatically debited and/or credited of monetary funds in a manner as accepted by the banking industry.

Service provider server 380, in one embodiment, may be configured to maintain one or more user accounts and merchant accounts in an account database on storage module 386, each of which may include account information 388 associated with one or more individual users (e.g., user 102) and merchants. For example, account information 388 may include private financial information of user 102 and merchants (e.g., one or more merchants associated with merchant servers 390), such as one or more account numbers, passwords, credit card information, banking information, or other types of financial information, which may be used to facilitate financial transactions between user 102, and one or more merchants associated with merchant servers 390. Account information 388 may also include personal information, such as one or more contact information (e.g., phone number, address, email, etc.) and other account IDs of user 102 that are maintained by third parties (e.g., user names or account numbers). In various aspects, the methods and systems described herein may be modified to accommodate users and/or merchants that may or may not be associated with at least one existing user account and/or merchant account, respectively.

In one implementation, user 102 may have identity attributes stored with service provider server 380, and user 102 may have credentials to authenticate or verify identity with service provider server 380. User attributes may include personal information, banking information and/or funding source information. In various aspects, the user attributes may be passed to service provider server 380 as part of a login, search, selection, purchase, and/or payment request, and the user attributes may be utilized by service provider server 380 to associate user 102 with one or more particular user accounts maintained by service provider server 380.

One or more merchant servers 390, in various embodiments, may be maintained by one or more business entities that offer various items, such as goods and/or services, for purchase and payment (e.g., a clothing store, an electronics store, a restaurant, a café, or other merchant) or, in some cases, by a partner of a business entity that processes transactions on behalf of business entities. The business entities may maintain a merchant website through which the various items are offered for purchase and payment. In some embodiments, business entities may need registration of user identity information as part of offering items to user 102 over network 170. As such, each of one or more merchant servers 390 may include a merchant database on a storage module 392 for identifying available items, which may be made available, at least in part, to interactive display system 110 and/or user device 150 for viewing and purchase by user 102. In one or more embodiments, user 102 may complete a transaction such as purchasing the items via service provider server 380.

Each of merchant servers 390, in one embodiment, may include a marketplace application 394, which may be configured to provide data over network 170 to interactive display system 110 and/or user interface application 352 of user device 150. For example, marketplace application 394 may transmit data including visual content for items and item information to interactive display system 110, which displays the items on display panel 112. User 102 may interact with marketplace application 394 through the user interface application 352 by placing user device 150 in front of display panel 112 such that user device 150 communicates with interactive display system 110.

Each of merchant servers 390, in one embodiment, may include at least one merchant identifier 396, which may be included as part of the one or more items made available for purchase so that, for example, particular items are associated with particular merchants. In one implementation, merchant identifier 396 may include one or more attributes and/or parameters related to the merchant, such as business and banking information. Merchant identifier 396 may include attributes related to merchant server 390, such as identification information (e.g., a serial number, a location address, GPS coordinates, a network identification number, etc.). In various embodiments, user 102 may conduct transactions (e.g., searching, selection, monitoring, purchasing, and/or providing payment for items) with each merchant server 390 via service provider server 380 over network 170.

The merchant website, in various embodiments, may communicate (e.g., using merchant server 390) with service provider server 380 over network 170. For example, the merchant website may communicate with service provider server 380 in the course of various services offered by service provider server 380 to the merchant website, such as payment intermediary between customers of the merchant website and the merchant website itself. The merchant website may use an application programming interface (API) that allows it to offer sale of goods in which customers are allowed to make payment through service provider server 380, while user 102 may have an account with service provider server 380 that allows user 102 to use service provider server 380 for making payments to merchants that allow use of authentication, authorization, and payment services of service provider server 380 as a payment intermediary. The merchant website may also have an account with service provider server 380.

Figure 4:
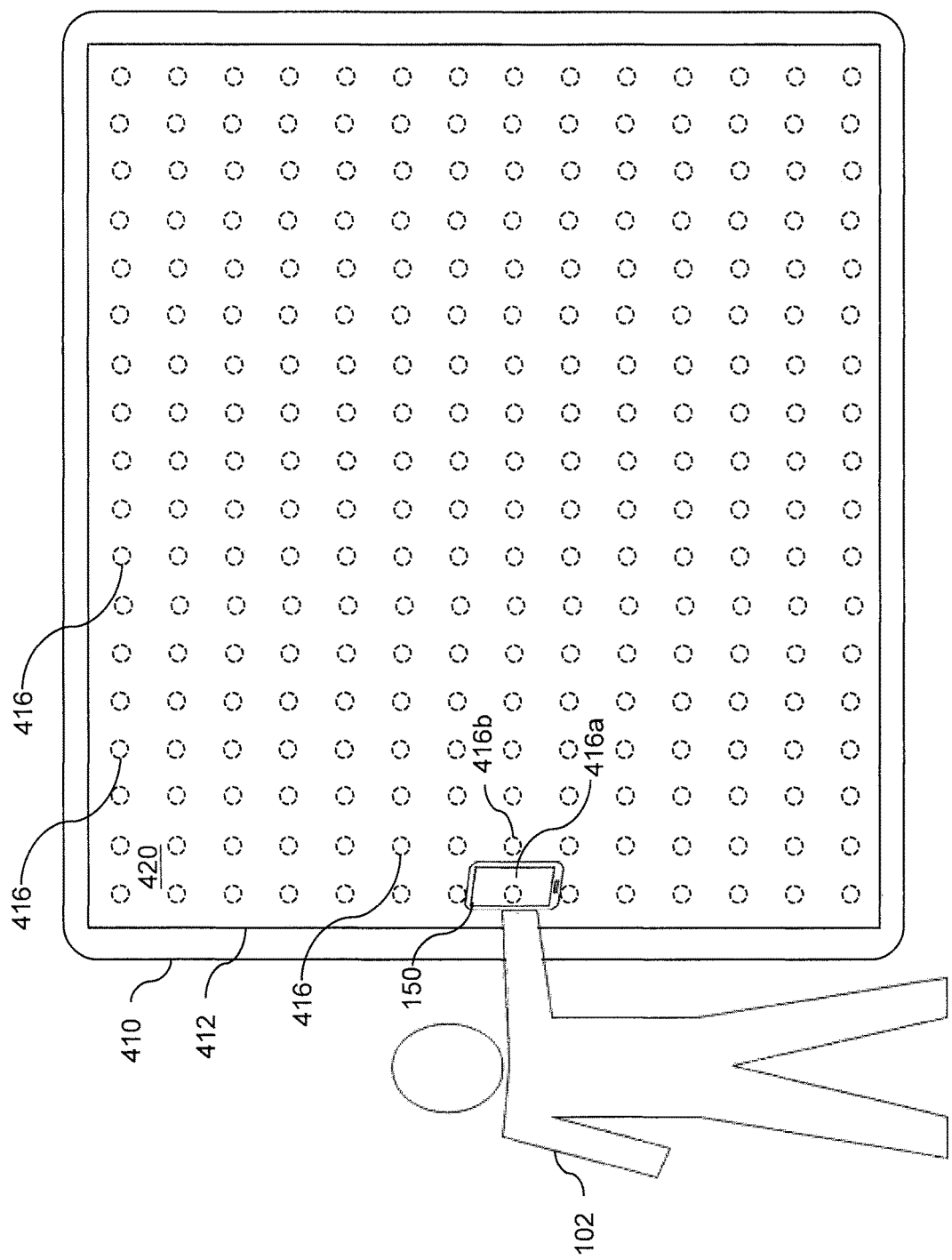
FIG. 4 is a diagram illustrating a user interacting with an interactive display system with a user device according to an embodiment of the present disclosure.

Referring now to FIG. 4, a diagram of user 102 holding user device 150 in front of interactive display system 410 is illustrated according to an embodiment of the present disclosure. A plurality of NFC devices 416 are shown with dashed lines (as NFC devices 216 in FIGS. 2b-d), indicating that NFC devices 416 are located behind or within a display panel 412. In an embodiment, plurality of NFC devices 416 is an array of NFC devices 416 arranged such that when user 102 holds up user device 150 anywhere near display panel 412, at least one of NFC devices 416 will detect and communicate with user device 150. In an example, user device 150 is detected by one of NFC devices 416 (e.g., NFC device 416*a*). In another example, user device 150 is detected by two neighboring NFC devices 416 (e.g., NFC device 416*a* and 416*b*).

Figure 5:
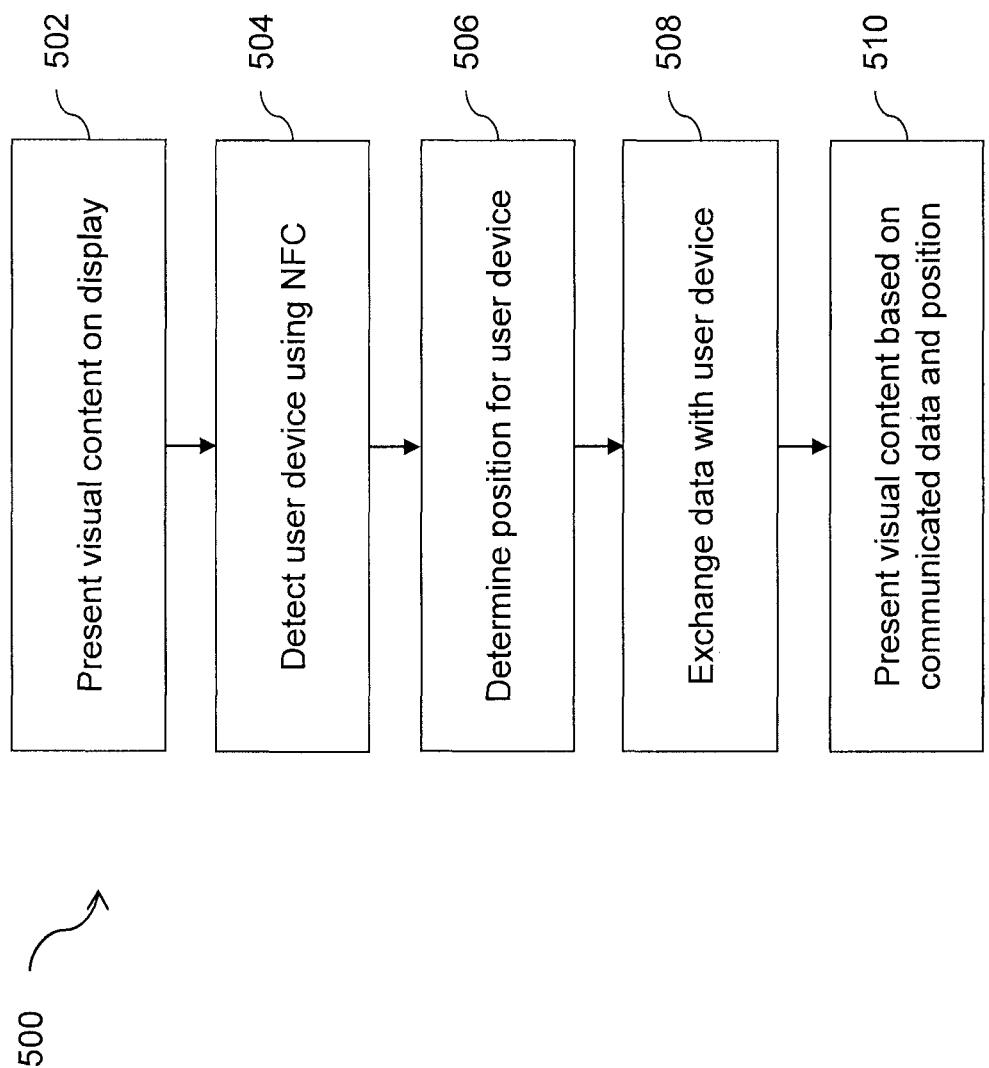
FIG. 5 is a flowchart showing an illustrative method for providing interaction between a user device and an interactive display system using near field communications according to an embodiment of the present disclosure.

Referring now to FIG. 5, a flowchart 500 of a method for providing interaction between user device 150 and an interactive display system, such as interactive display system 410, using near field communications is illustrated according to an embodiment of the present disclosure.

At block 502, interactive display system 410 presents visual content 420 (see FIG. 4) on display panel 412. User 102 may view visual content 420 and decide to interact with interactive display system 410.

At block 504, interactive display system 410 detects that user device 150 is adjacent to display panel 412 using at least one of plurality of NFC devices 416. In various embodiments, user 102 may place user device 150 in front of display panel 412 and close enough to be within range of NFC devices 416 (e.g., within 2 cm, within 5 cm, within 10 cm, within 20 cm, etc.). User device 150 may be within communication range (e.g., inside a communication area) of at least one of NFC devices 416, such as NFC device 416*a*. In an embodiment, NFC device 416*a* may receive identifier data packets from user device 150. The identifier data packets may include one or more user identifiers (e.g., user identifier 356) that identify user 102, user device 150, a user account associated with user 102, and/or a user account associated with user device 150. In response to NFC device 416*a* receiving the identifier data packets, interactive display system 410 (e.g., by processor 122 and/or detection module 318) determines that user device 150 is adjacent to display device 140.

At block 506, interactive display system 410 determines a position for user device 150. In an embodiment, interactive display system 410 (e.g., by processor 122 and/or detection module 318) determines which particular NFC device or devices 416 detected user device 150 (e.g., NFC device 416*a*), and determines a position relative to display panel 412 for user device 150. In an example, the position may be a physical coordinate corresponding to a physical coordinate of a particular NFC device (e.g., NFC device 416*a*). In another example, the position may be an area corresponding to a particular NFC device (e.g., NFC device 416*a*), such as a communication area of the particular NFC device. In a further example, the position may be a physical coordinate or area between two NFC devices (e.g., NFC device 416*a* and 416*b*).

At block 508, interactive display system 410 exchanges data with user device 150 using the at least one NFC device 416. In an embodiment, interactive display system 410 (e.g., by processor 122 and/or control module 320) exchanges data with user device 150, which may include transmitting data to user device 150 and/or receiving data from user device 150. The data that is exchanged may depend on the position for user device 150 and/or the part of the visual content that is presented at or near the at least one NFC device 416

At block 510, interactive display system 410 changes, modifies, and/or alters the presented visual content based on the exchanged data and/or the position for user device 150. In an embodiment, interactive display system 410 (e.g., by processor 122 and/or control module 320) may determine a corresponding location on the visual content based on the position for user device 150, and change a part of the visual content that is at the location based on the exchanged data and/or the position for user device. In other embodiments, a part of the visual content at another location may be changed, modified, or altered based on the exchanged data and/or the position for user device. In an example, a change in visual content at the location may be followed by changes in the other locations (e.g., a ripple effect, a ball moving from the location to another location, etc.) Such interaction may be utilized in various applications, such as games or activities played by multiple users interacting with interactive display system 410.

Figure 6:
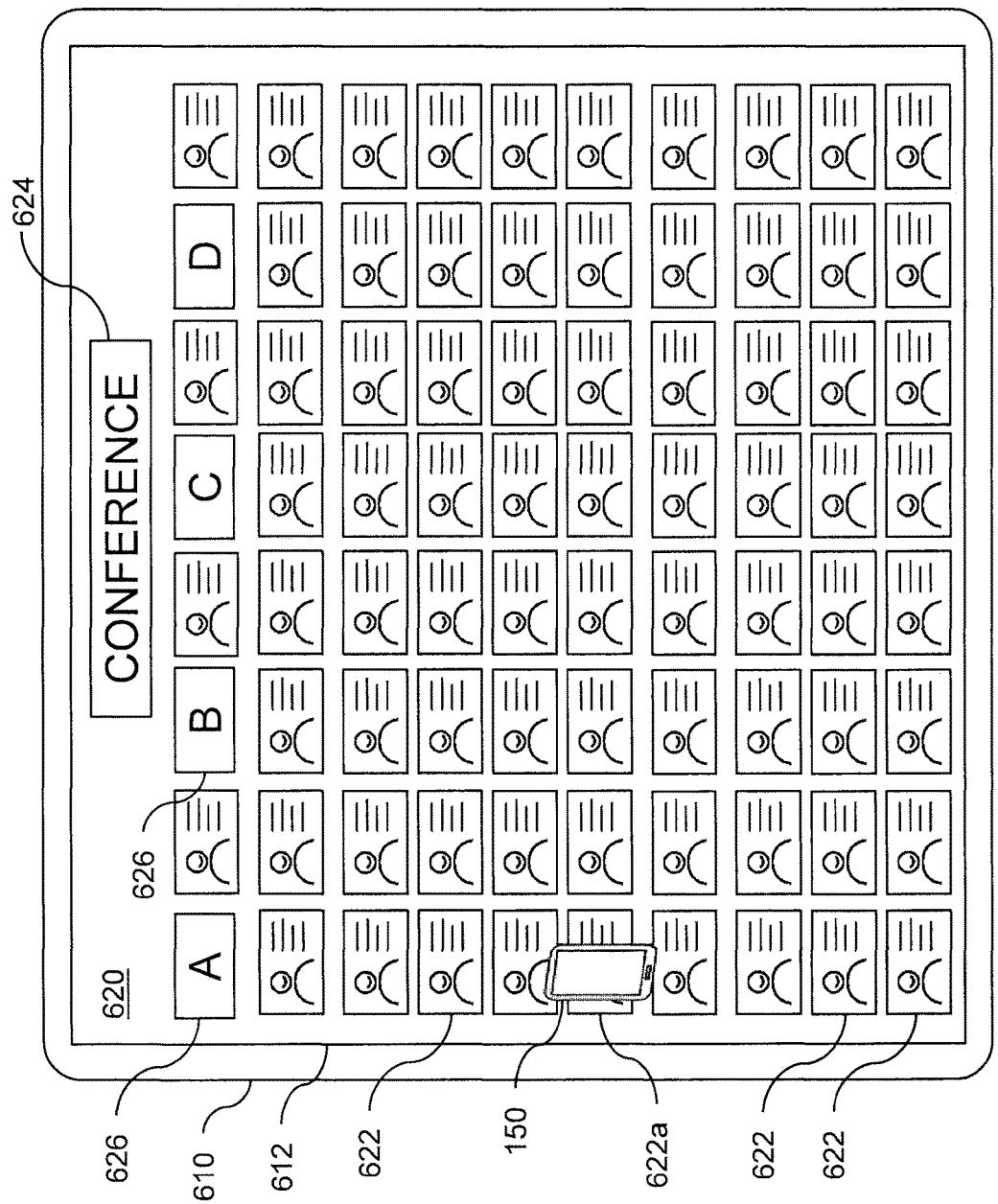
FIG. 6 is a diagram illustrating an interactive display system presenting user representations for check-in to a location or an event according to an embodiment of the present disclosure.

Referring now to FIG. 6, a diagram of an interactive display system 610 presenting visual content 620 including user representations 622 for check-in on a display panel 612 is illustrated according to an embodiment of the present disclosure. In various embodiments, user 102 is at a location or event where users 102 may check-in (e.g., a conference, a seminar, a meeting, a wedding, a convention, a movie theater, a concert, an airport, a stadium, a hotel, etc.). Interactive display system 610 provides check-in services at the location. Interactive display system 610 may present visual content 620 including user representations 622 that identify users (e.g. names of users, pictures of users, seat numbers, usernames, registration numbers, and/or other user representations), a location or event name 624, and section names 626 on display panel 612. In some embodiments, section names 626 may be information that assists users 102 to find their respective user representations 626 (e.g., first letters of the alphabet of users' names, names of groups that users are in, etc.) and/or information regarding where users 102 are headed (e.g., names of halls, rooms, or gates).

Figure 7:
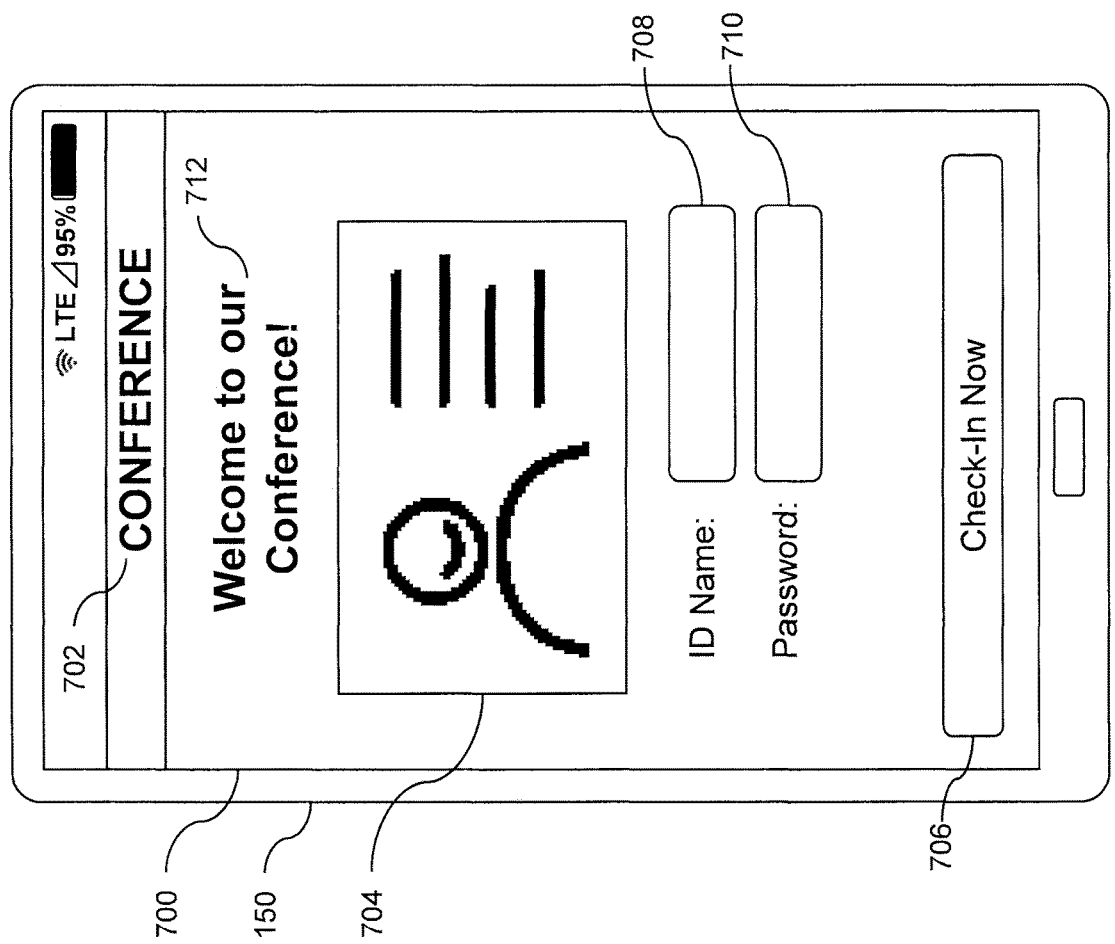
FIG. 7 is an illustrative screenshot of a check-in screen presented on a user device according to an embodiment of the present disclosure.

Referring now to FIG. 7, a screenshot of a check-in screen 700 presented on user device 150 is illustrated according to an embodiment of the present disclosure. In various embodiments, when user 102 places user device 150 near a particular user representation, such as user representation 622*a* of FIG. 6, user device 150 may present a location or event name 702, a user representation 704 corresponding to user representation 622*a*, and a check-in button 706 based on information received by user device 150 from interactive display system 610. In some embodiments, user device 150 may also present a user ID entry area 708, a password entry area 710, and/or other information 712 (e.g., a greeting, a schedule, directions, etc.).

Figure 8:
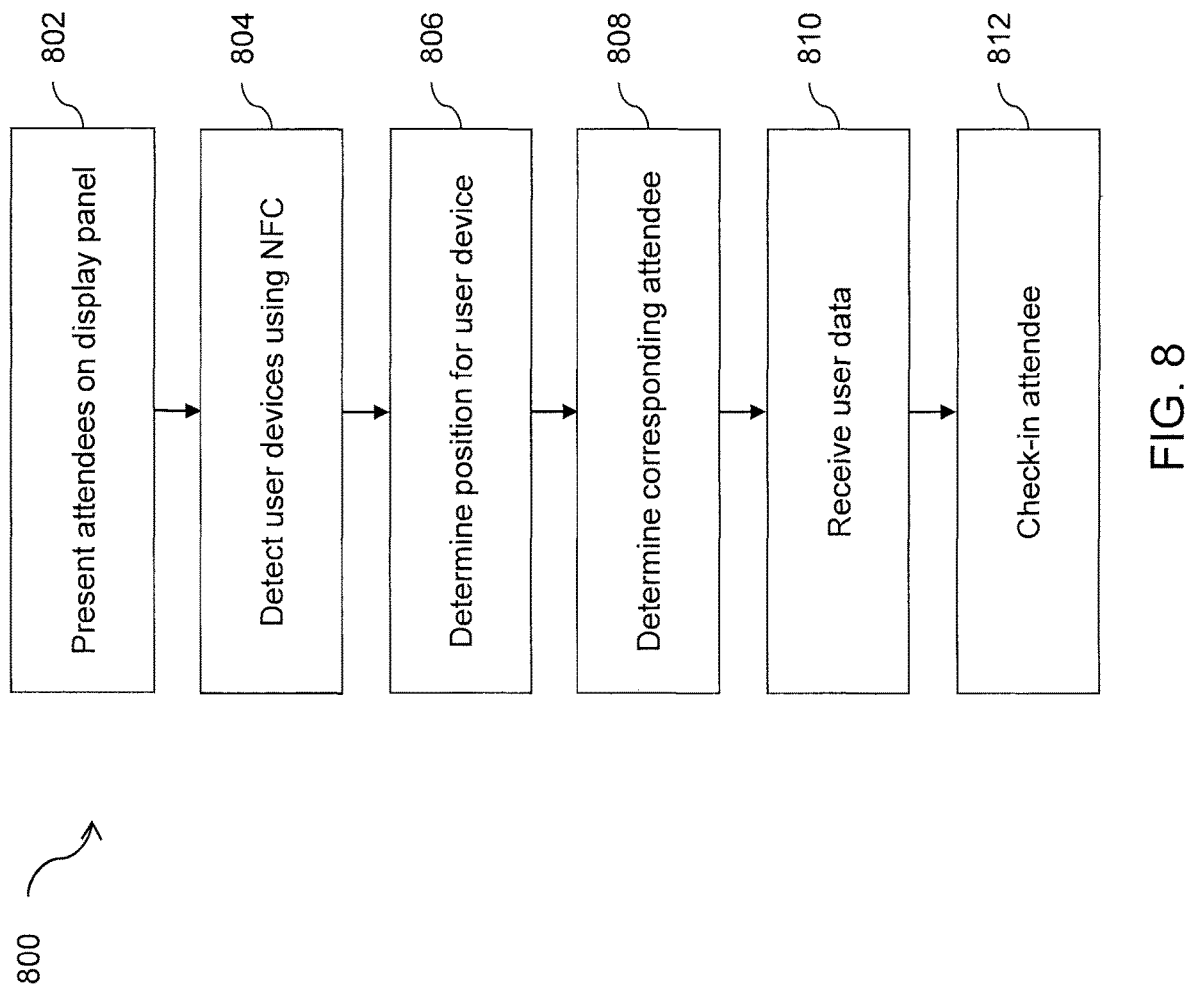
FIG. 8 is a flowchart showing an illustrative method for providing check-in through interaction between a user device and an interactive display system using near field communications according to an embodiment of the present disclosure.

Referring now to FIG. 8, a flowchart 800 of a method for providing check-in through interaction between user device 150 and interactive display system 610 using near field communications is illustrated according to an embodiment of the present disclosure.

At block 802, interactive display system 610 presents user representations 622 of users (e.g., attendees) on display panel 612. User 102 may decide to check-in using interactive display system 610 and hold user device 150 in front of a particular user representation for a particular user (e.g., a particular attendee), such as user representation 622*a*.

At block 804, interactive display system 610 detects that user device 150 is adjacent to display panel 612 using at least one of a plurality of NFC devices, such as at least one of NFC devices 416 as described at block 404 of FIG. 4.

At block 806, interactive display system 610 determines a position for user device 150 based on which of the NFC devices detected user device 150, such as which NFC device or devices 416 detected user device 150 as described at block 406 of FIG. 4.

At block 808, interactive display system 610 determines, based on the position for user device 150, a corresponding attendee of the position, such as an attendee corresponding to user representation 622*a*.

At block 810, interactive display system 610 receives user data from user device 150. In an embodiment, interactive display system 610 may receive user data including one or more user identifiers (e.g., user identifier 356) that identify user 102, user device 150, a user account associated with user 102, and/or a user account associated with user device 150. User device 150 may transmit user identifiers to interactive display system 610 automatically or after user authorization.

In another embodiment, interactive display system 610 may transmit data for user check-in screen 700 to user device 150. User 102 may enter user credentials (e.g., user ID in user ID entry area 708, password in password entry area 710, etc.) on check-in screen 700 presented on user device 150. User 102 may confirm that user representation 704 belongs to user 102 by selecting check-in button 706. Interactive display system 610 may then receive the user data that includes the user information entered on user check-in screen 700.

At block 812, interactive display system 110 checks-in user 102 based on the user data. In an embodiment, interactive display system 110 may authenticate user 102 by determining that user representation 622a and the user data (e.g., user identifier, user credentials, and/or user confirmation) belong to or are associated with the same user, and check-in user 102.

Figure 9:
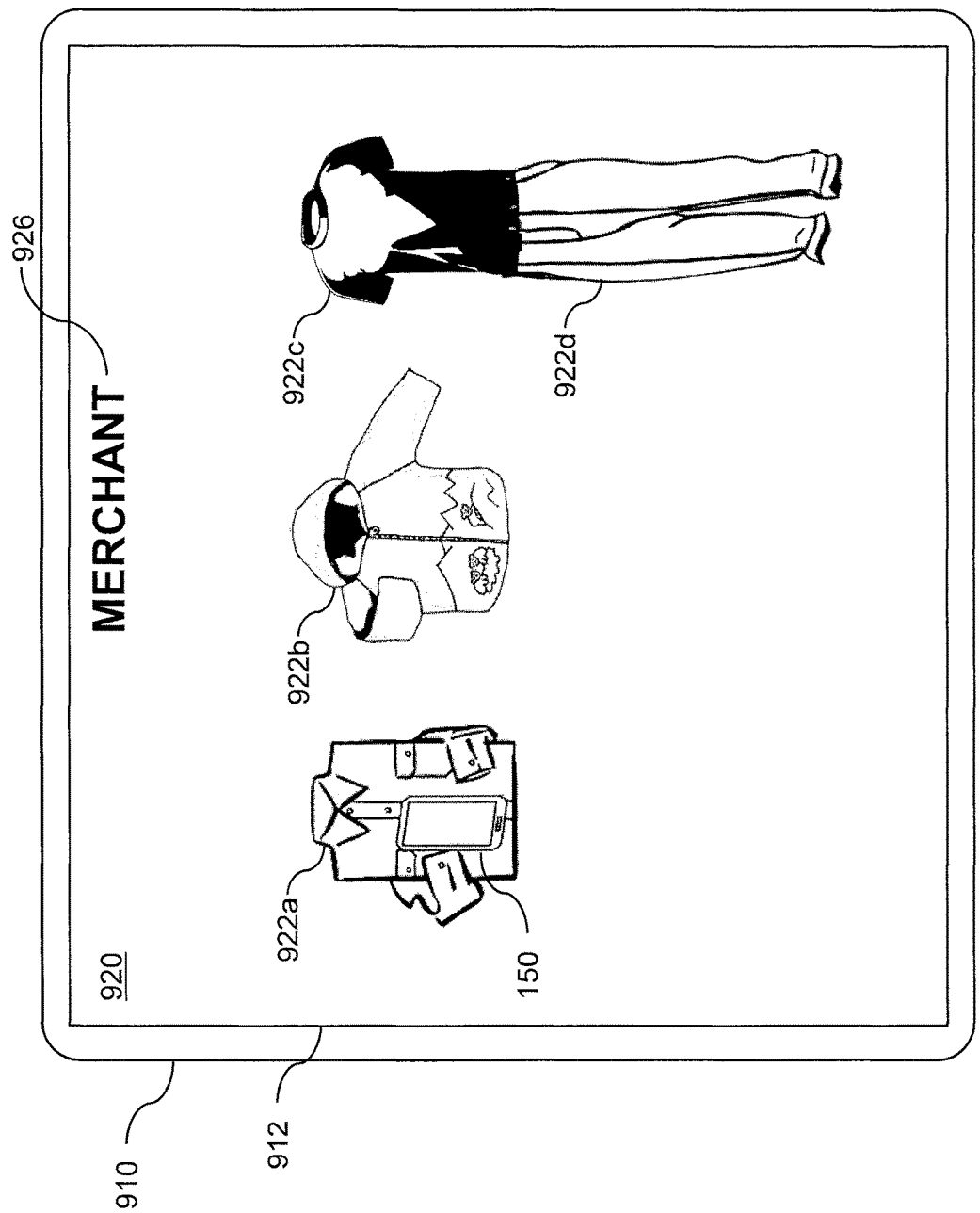
FIG. 9 is a diagram illustrating an interactive display system presenting items according to an embodiment of the present disclosure.

Referring now to FIG. 9, a diagram of interactive display system 910 presenting items 922a-d (e.g., goods and/or services) on a display panel 912 is illustrated according to an embodiment of the present disclosure. In various embodiments, user 102 is at a location or event with items for sale (e.g., a merchant such as a clothing store, an electronics store, a restaurant, a café, etc.), for viewing (e.g., a museum, an exhibition, etc.), or for loaning (e.g., a library, a movie rental, etc.). Interactive display system 910 may present visual content 920 including items 922a-d and/or location or event name 926 (e.g., a merchant name) on display panel 912.

Figure 10:
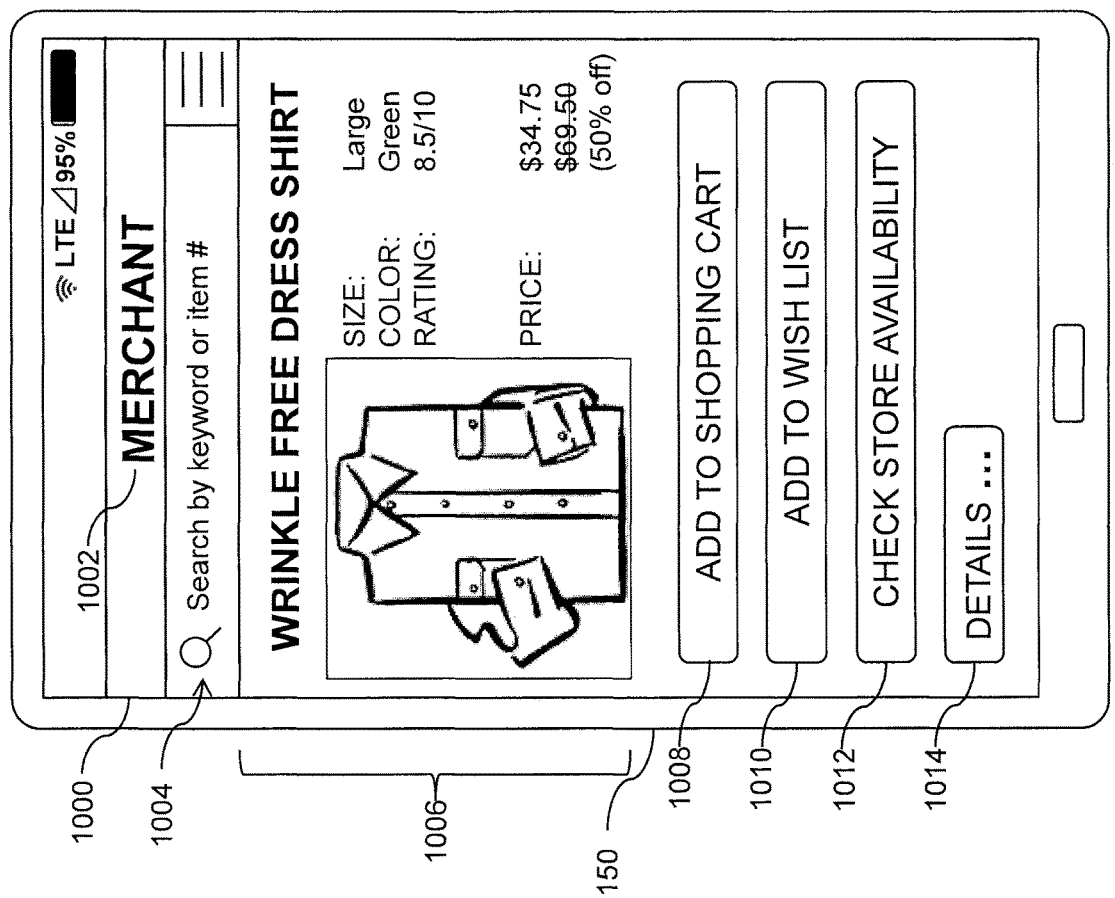
FIG. 10 is an illustrative screenshot of an item information screen presented on a user device according to an embodiment of the present disclosure.

Referring now to FIG. 10, a screenshot of an item information screen 1000 presented on user device 150 is illustrated according to an embodiment of the present disclosure. In various embodiments, when user 102 places user device 150 near a particular item 922a, user device 150 may be detected by an NFC device near the item, receive item data for that item via the NFC device. User device 150 may present a location or event name 1002, item information 1006 corresponding to item 922a, and purchase-related options, such as an add to shopping cart button 1008, based on the received item data. In some embodiments, user device 150 may also present a search area 1004 and item-related options, for example, an add to wish list button 1010, check store availability button 1012, and/or a details button 1014 for further information.

Figure 11:
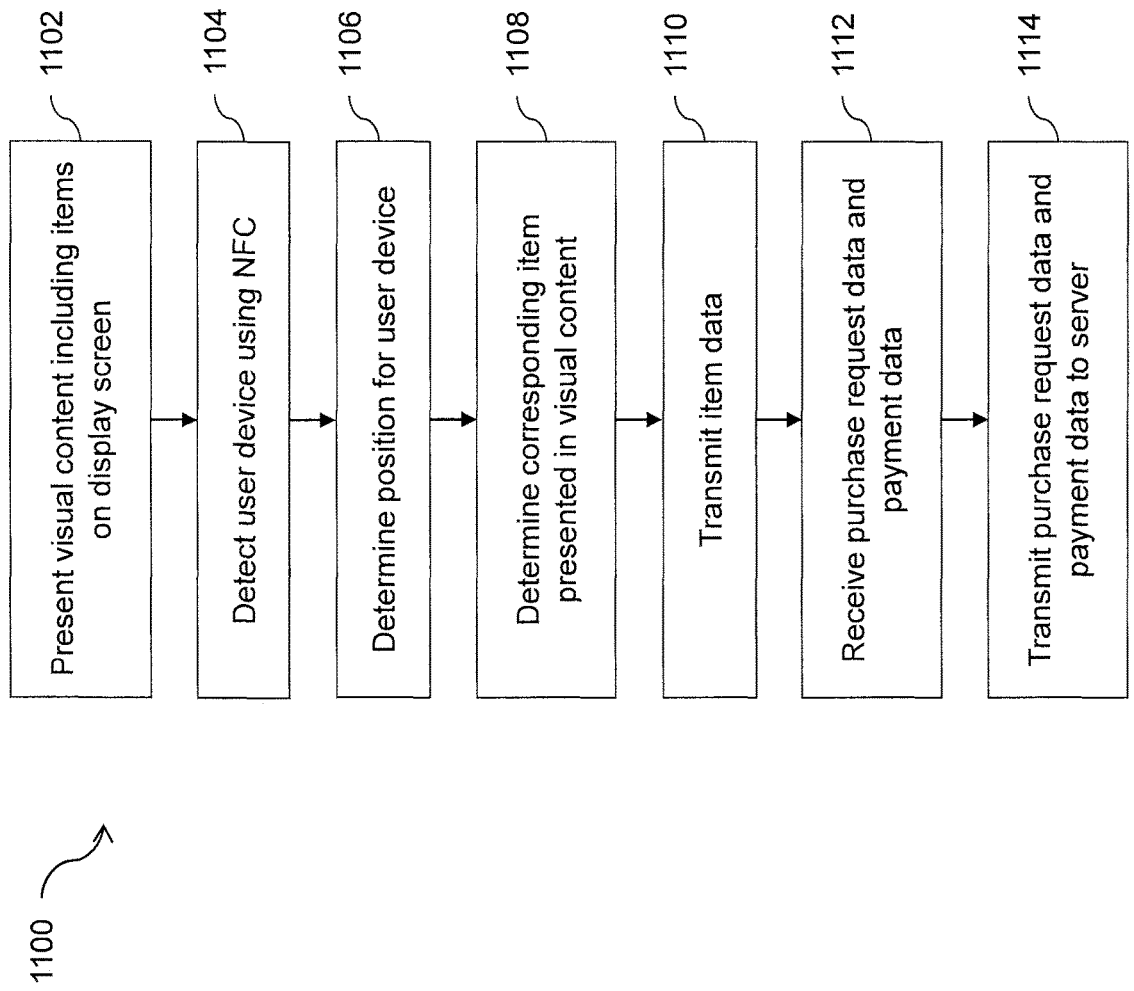
FIG. 11 is a flowchart showing a method for providing item information and/or offering items for sale through interaction between a user device and an interactive display system using near field communications according to an embodiment of the present disclosure.

Referring now to FIG. 11, a flowchart 1100 of a method for providing item information and/or offering items for sale through interaction between a user device and an interactive display system using near field communications is illustrated according to an embodiment of the present disclosure.

At block 1102, interactive display system 910 presents items, such as items 922a-d, on display panel 912. User 102 may decide he or she is interested in a particular item, such as item 922a, and hold user device 150 in front of item 922a.

At block 1104, interactive display system 910 detects that user device 150 is adjacent to display panel 912 using at least one NFC device, such as at least one of NFC devices 416 as described at block 404 of FIG. 4.

At block 1106, interactive display system 910 determines a position for user device 150 based on which of the NFC devices detected user device 150, such as which NFC device or devices 416 detected user device 150 as described at block 406 of FIG. 4.

At block 1108, interactive display system 910 determines, based on the position for user device 150, corresponding item 922a to that position.

At block 1110, interactive display system 910 transmits item data to user device 150. In an embodiment, interactive display system 910 transmits item data including item information. User device 150 receives the item data and presents the item information on item information screen 1000 (see FIG. 10). In an example, if user 102 is at a store, restaurant, or movie theater, item information may include, respectively, merchandise information (e.g., merchandise pictures, price, sizing, reviews, etc.), food item information (nutrition information, price, reviews, etc.), or movie information (e.g., a summary, seat selection option, reviews, etc.). In another example, if user 102 is at a museum or an exhibition, item information may be information regarding an item on display. In a further example, if user 102 is in a library or movie rental, item information may include, respectively, book information or movie information (e.g., a summary and loan period).

In an embodiment where user 102 is at a merchant location, interactive display system 910 transmits item data including purchase information for providing an option to purchase item 922a, and user device 150 receives the item data and provides the option to purchase item 922a to user 102 on item information screen 1000. In an example, interactive display system 910 is configured as a point of sale for the merchant, and user device 150 provides the option to purchase item 922a through interactive display system 910. In other examples, user device 150 provides an option to purchase item 922a through merchant server 390 and/or service provider server 380. In a further example, user device 150 provides an option to purchase item 922a via the merchant website, such as by providing a button (e.g., add to shopping cart button 1008) that links to a purchase page or a purchase confirmation page of the merchant website.

At block 1112, interactive display system 910 receives purchase request data and payment data. In an embodiment, in response to user 102 selecting to purchase item 922a on user device 150, user device 150 transmits purchase request data and payment data to interactive display system 910.

At block 1114, interactive display system 910 transmits purchase request data and payment data to merchant server 390 and/or service provider server 380. In other embodiments, user device 150 may transmit purchase request data and payment data directly to merchant server 390, service provider server 380, and/or the merchant website over network 170 in place of or in addition to transmitting the purchase request data to interactive display system 910. Service provider server 380 may process the purchase request and payment based on the purchase request data and the payment data.

Figure 12A:
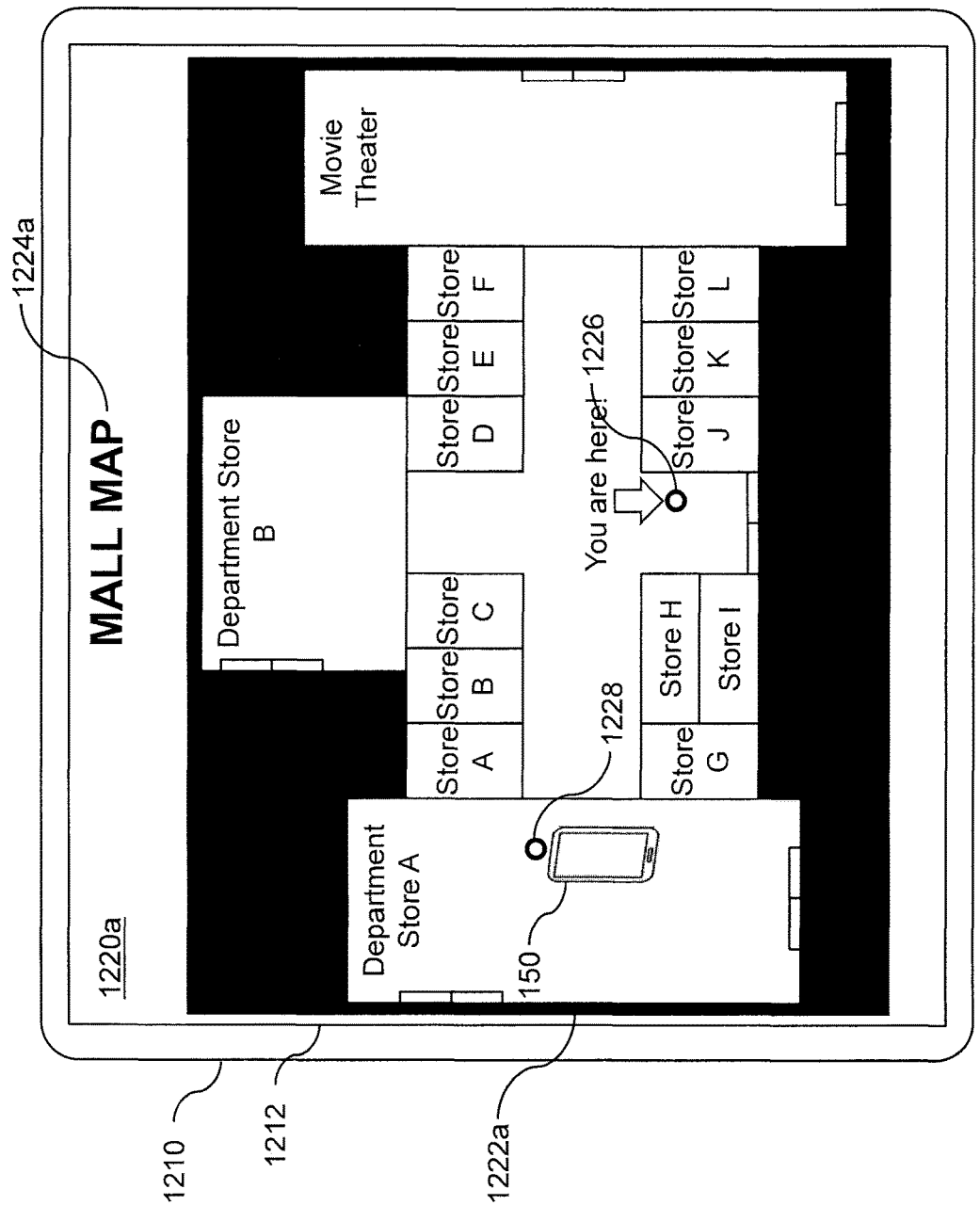
FIGS. 12a and 12b are diagrams illustrating an interactive display system presenting a map according to embodiments of the present disclosure.
Figure 12B:
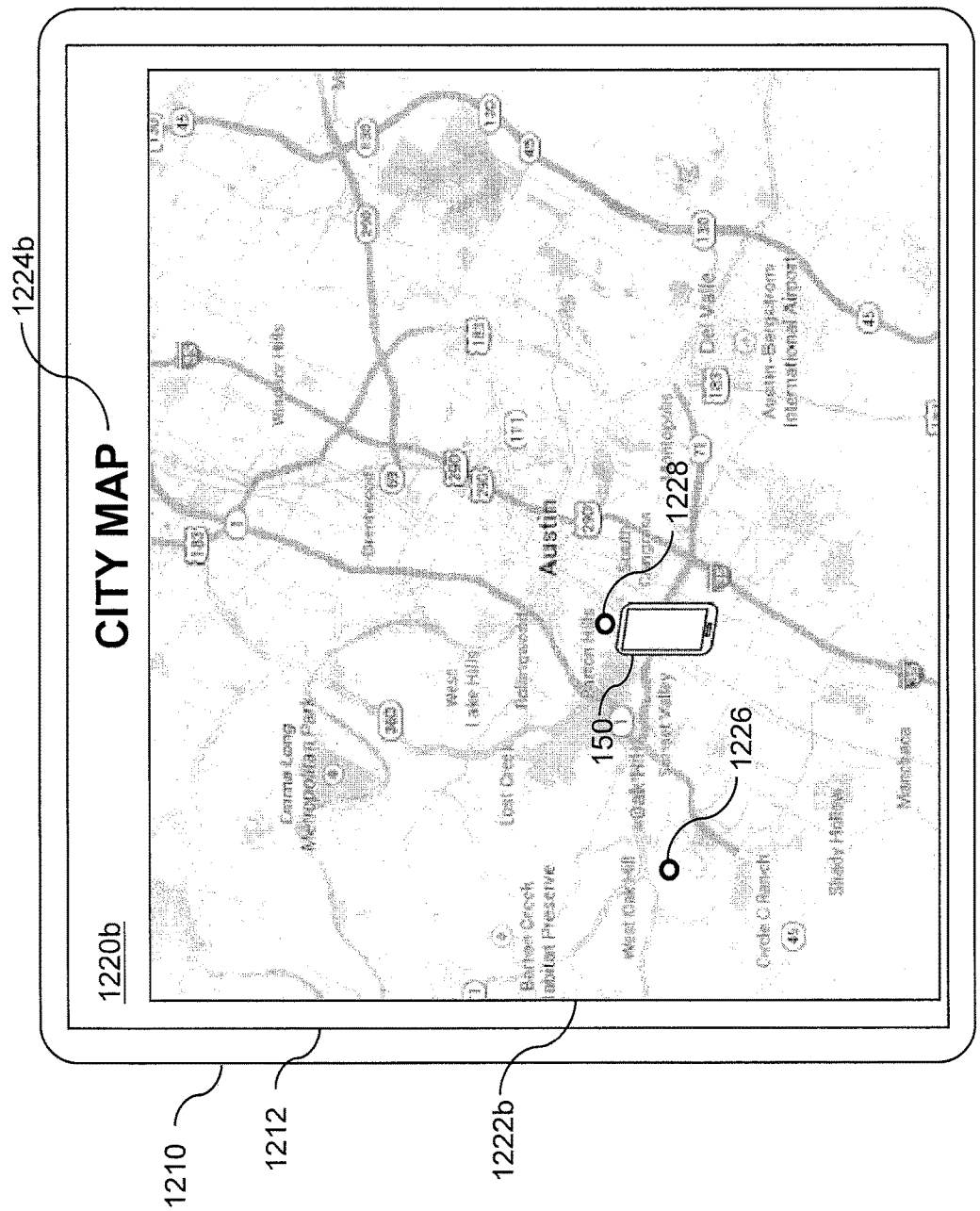

Referring now to FIGS. 12a and 12b, diagrams of an interactive display system 1210 presenting a map, for example a mall map 1222a or a city map 1222b, on a display panel 1212 are illustrated according to embodiments of the present disclosure. In various embodiments, user 102 is at a location or event (e.g., a mall, a city, a park, an amusement park, an airport, a stadium, a building, a store, a restaurant, etc.). Interactive display system 1210 may present visual content, such as visual content 1220a or 1220b, including a map, such as map 1222a or 1222b, a location/event name or map name 1224a or 1224b, a location A 1226 (e.g., a current location), and a location B 1228 (e.g., a location of interest) on display panel 1212. User 102 may place user device 150 at a position anywhere on map 1222a and 1222b to select location B 1228. In some embodiments, location A 1226 and/or location B 1228 may be visibly indicated on visible content 1220*a* and 1220*b*. In other embodiments, location A 1226 and/or location B 1228 may not be shown on visible content 1220*a* and 1220*b*.

Figure 13A:
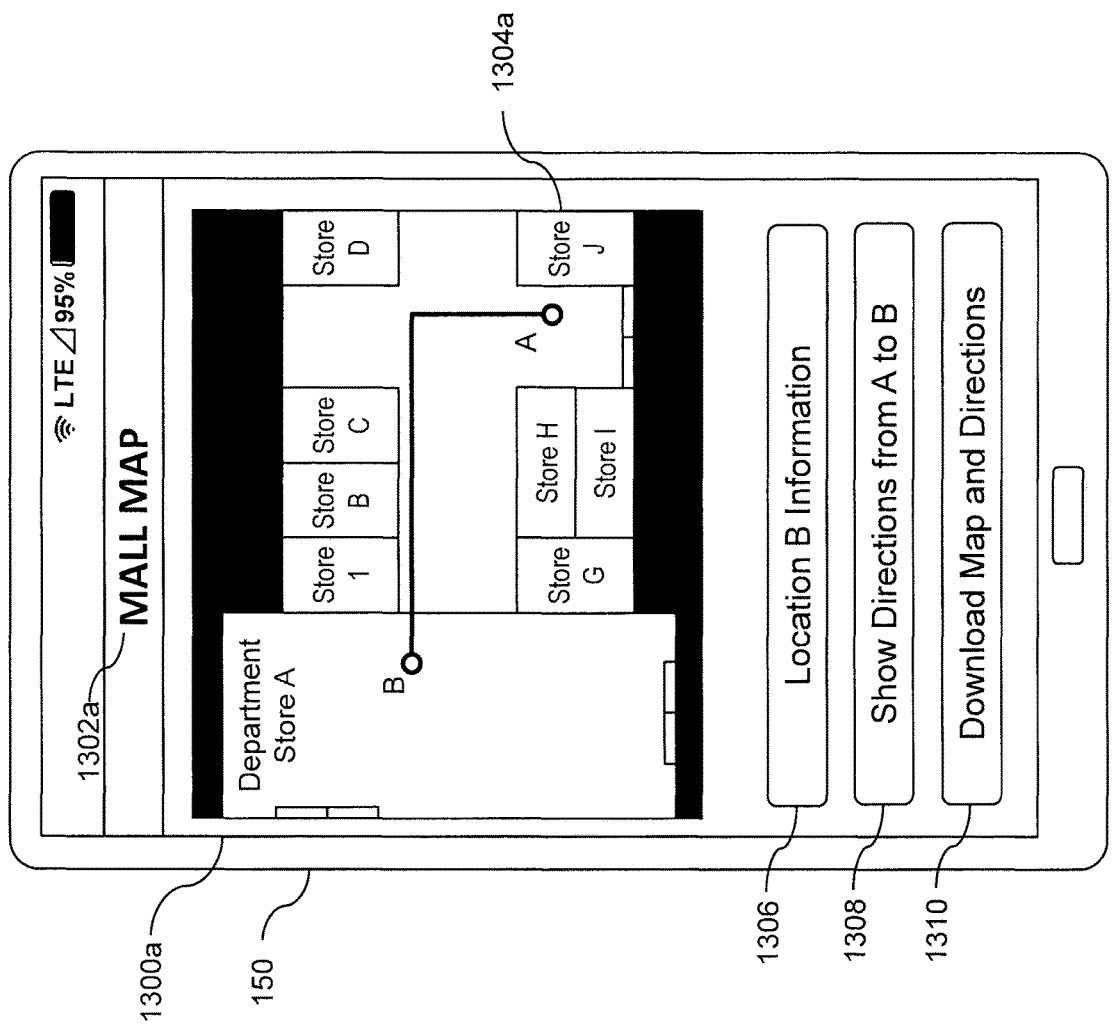
FIGS. 13a and 13b are illustrative screenshots of map screens presented on a user device according to embodiments of the present disclosure.
Figure 13B:
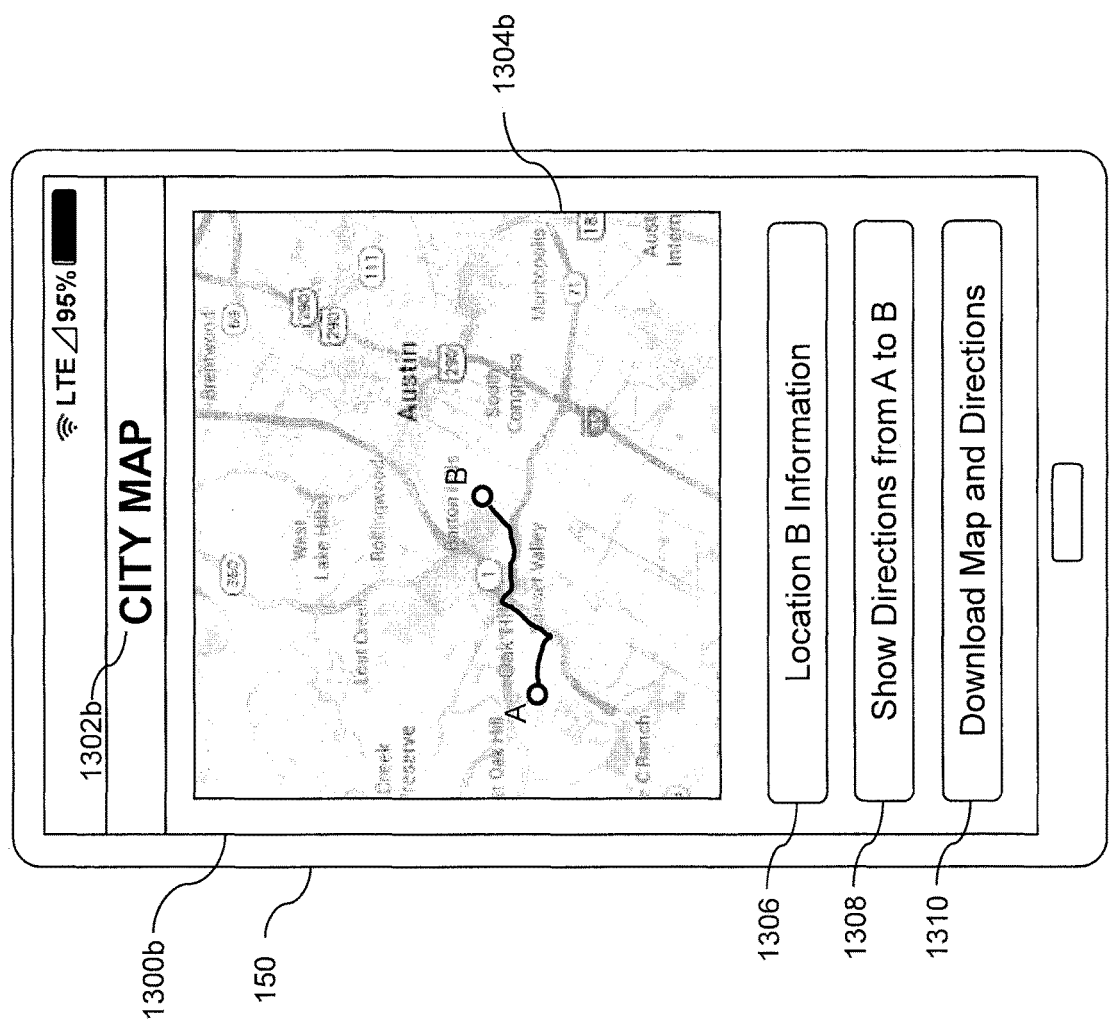

Referring now to FIGS. 13*a* and 13*b*, screenshots of map screens, for example a mall map screen 1300*a* or a city map screen 1300*b*, presented on user device 150 are illustrated according to embodiments of the present disclosure. When user 102 selects a location by placing user device 150 in front of a particular location, such as location B 1228, user device 150 may present a location or event name 1302*a* or 1302*b*, a map 1304*a* or 1304*b*, a location information button 1306, a directions button 1308, and/or a download button 1310.

Referring now to FIG. 14, a flowchart 1400 of a method for providing location information and/or directions through interaction between user device 150 and interactive display system 1210 using near field communications is illustrated according to an embodiment of the present disclosure.

At block 1402, interactive display system 1210 presents a map, such as map 1222*a* or map 1220*b*, on display panel 1212. User 102 may decide he or she is interested in a particular location, such as location B 1228, and hold user device 150 at or near location B 1228.

At block 1404, interactive display system 1210 detects that user device 150 is adjacent to display panel 1212 using at least one NFC device, such as at least one of NFC devices 416 as described at block 404 of FIG. 4.

At block 1406, interactive display system 1210 determines a position for user device 150 based on which of the NFC devices detected user device 150, such as which NFC device or devices 416 detected user device 150 as described at block 406 of FIG. 4.

At block 1408, interactive display system 1210 determines, based on the position for user device 150, corresponding location B 1228.

At block 1410, interactive display system 1210 transmits location data to user device 150. In an embodiment, interactive display system 910 transmits location data including map 1304*a* or 1304*b*, location information, and directions. User device 150 may receive location data and present map 1304*a* or 1304*b*, location information button 1306 for accessing the location information, and/or directions button 1308 for accessing the directions on map screen 1300*a* or 1300*b*. The location information may include, for example, information regarding attractions, amenities, stores, store hours, etc., at location B 1228. The directions may include directions from location A 1226 (e.g., current location) to location B 1228 (e.g., location of interest where user 102 placed user device 150 on map 1222*a* or 1222*b*). In some embodiments, users 102 may be able to view items for purchase at a merchant at location B by receiving item data. User 102 may be able to conveniently purchase items (e.g., as described at block 1112 and 1114 of FIG. 11) before heading over to the merchant.

Figure 15:
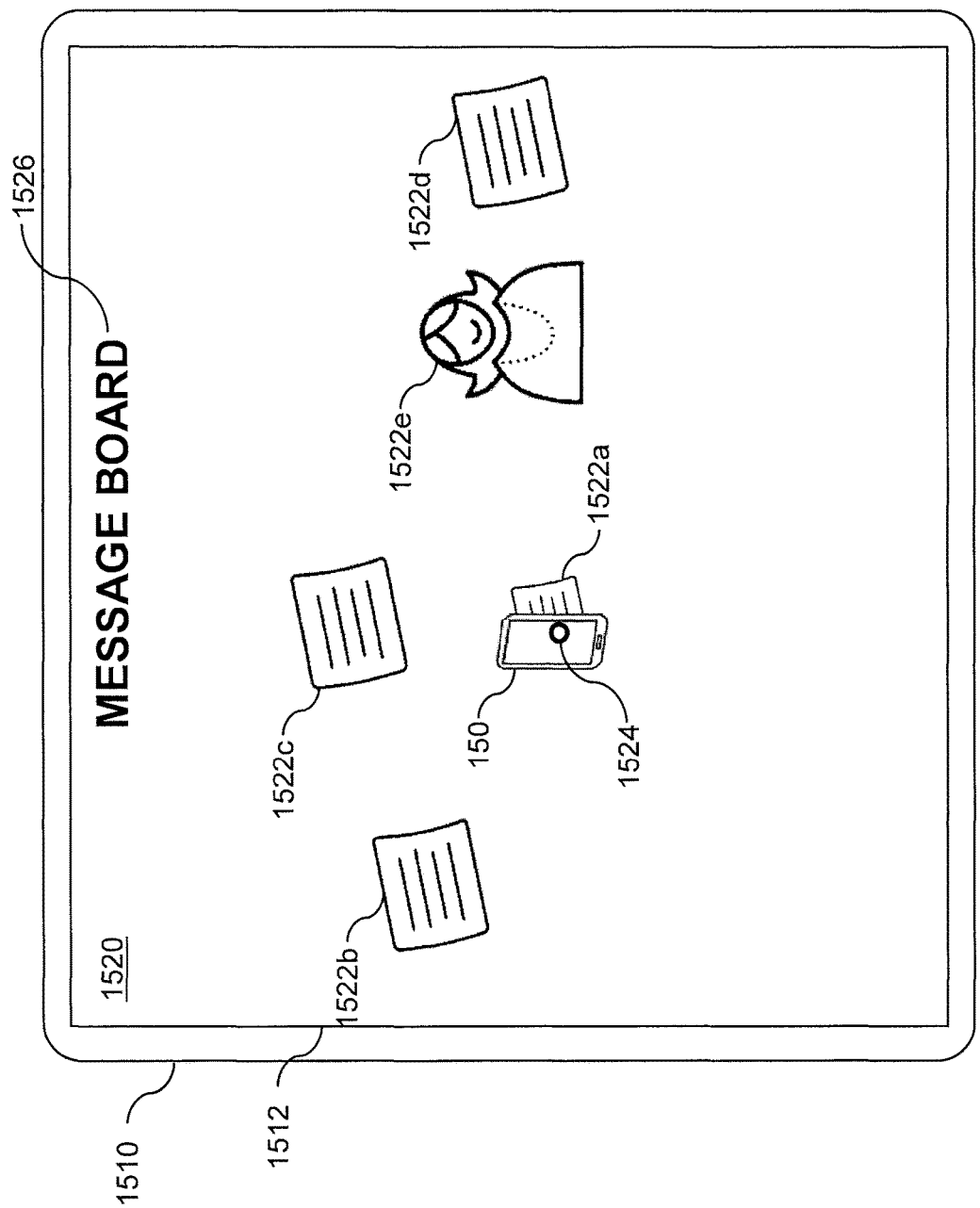
FIG. 15 is a diagram illustrating an interactive display system presenting messages according to an embodiment of the present disclosure.

Referring now to FIG. 15, a diagram of an interactive display system 1510 presenting messages 1522*a-e* on a display panel 1512 is illustrated according to an embodiment of the present disclosure. In various embodiments, user 102 is at a location or event with a message board (e.g., a commercial message board for posting advertisements, job postings, rental listings, classifieds, etc., or a crisis message board for posting information relating to a natural disaster, military conflict, terrorist attack, etc., or other message board). Interactive display system 1510 may present visual content 1520 including messages 1522*a-e* and/or message board name 1526 (e.g., a merchant name) on display panel 1512.

Figure 16:
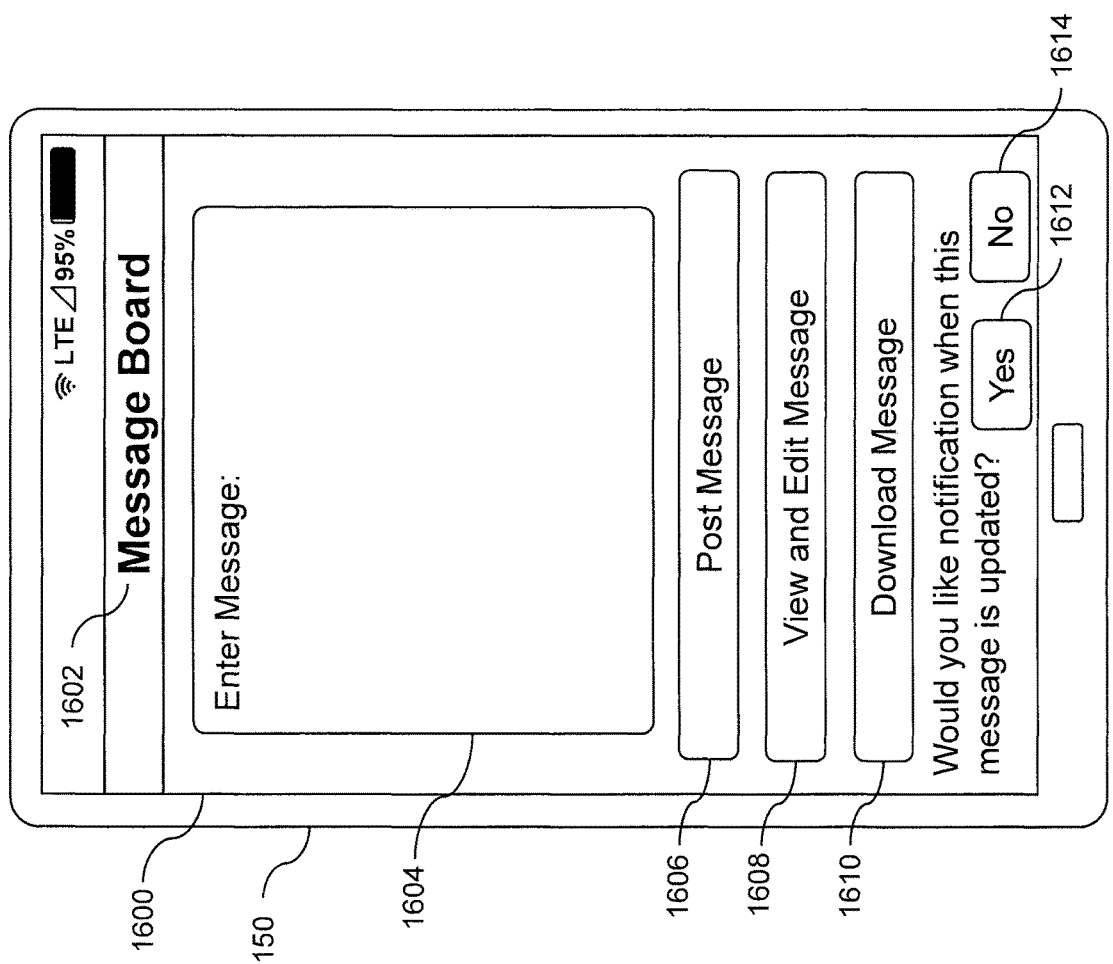
FIG. 16 is an illustrative screenshot of a message screen presented on a user device according to an embodiment of the present disclosure.

Referring now to FIG. 16, a screenshot of a message screen 1600 presented on user device 150 is illustrated according to an embodiment of the present disclosure. In various embodiments, when user 102 places user device 150 near a particular message board location 1524, user device 150 may present a message board name 1602, a message entry/display area 1604, a post message button 1606, a view and/or edit message button 1608, a download message button 1610, and buttons for an option to receive updates 1612 and 1614. In some embodiments, message board location 1524 corresponding to a position of user device 150 may be visibly indicated on visible content 1520. In other embodiments, message board location 1524 may not be shown on visible content 1520.

Figure 17:
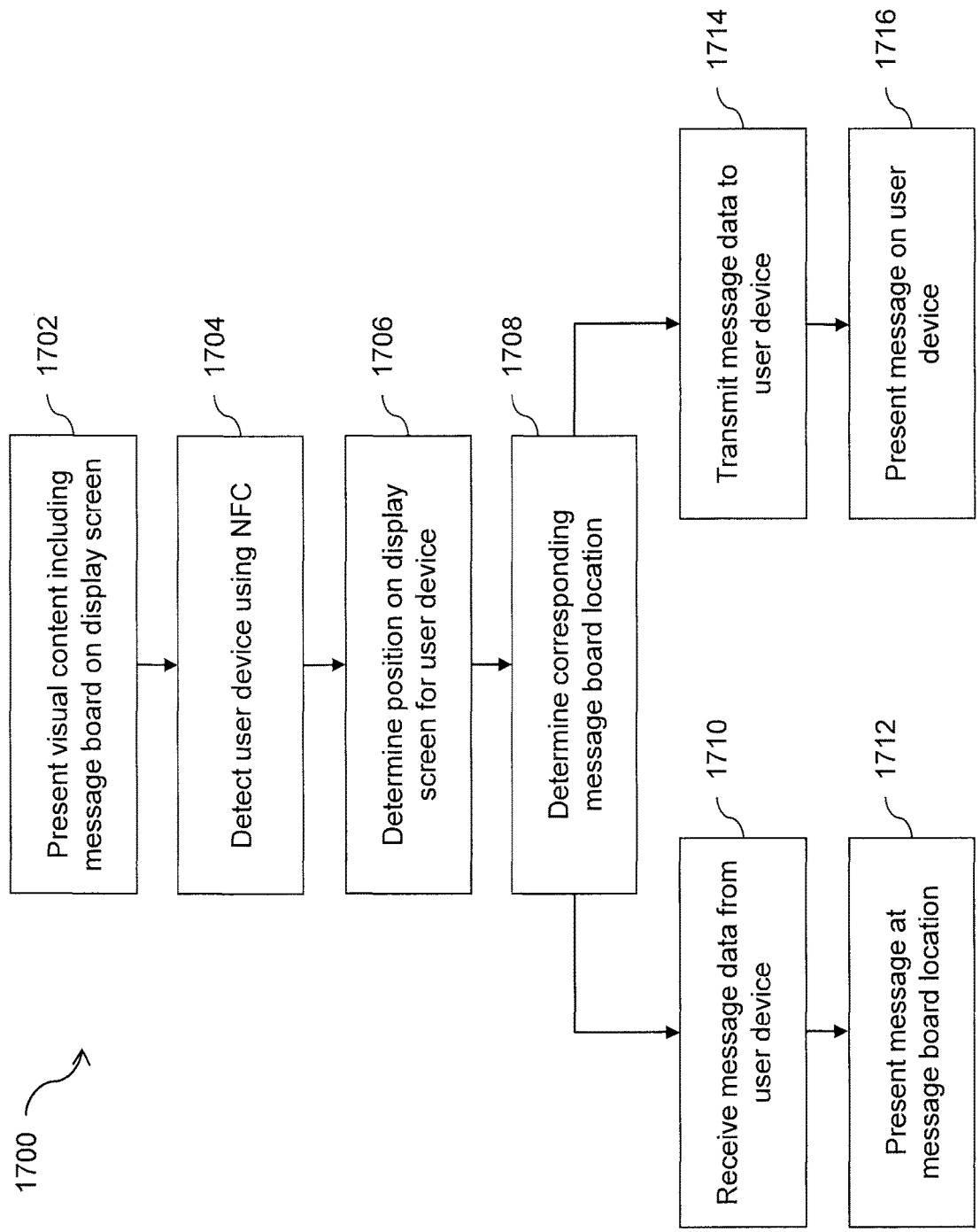
FIG. 17 is a flowchart showing an illustrative method for posting, editing, and/or downloading messages from a message board through interaction between a user device and an interactive display system using near field communications according to an embodiment of the present disclosure.

Referring now to FIG. 17, a flowchart 1700 of a method for posting, editing, and/or downloading messages on message board 1520 through interaction between user device 150 and interactive display system 1510 using near field communications is illustrated according to an embodiment of the present disclosure.

At block 1702, interactive display system 1510 presents messages on display panel 1512. User 102 may decide he or she would like to post a new message, or edit and/or download an existing message. User 102 may holds user device 150 in front of a particular message board location, such as message board location 1524.

At block 1704, interactive display system 1510 detects that user device 150 is adjacent to display panel 1512 using at least one NFC device, such as at least one of NFC devices 416 as described at block 404 of FIG. 4.

At block 1706, interactive display system 1510 determines a position for user device 150 based on which of the NFC devices detected user device 150, such as which NFC device or devices 416 detected user device 150 as described at block 406 of FIG. 4.

At block 1708, interactive display system 1510 determines, based on the position for user device 150, corresponding message board location 1524.

At block 1710, interactive display system 1510 receives message data from user device 150. In an embodiment, user 102 may compose a message on message entry/display area 1604 of message screen 1600 or select a message on user device 150. User 102 may select post message button 1606, and user device 150 may transmit message data for the message to interactive display system 1510.

At block 1712, interactive display system 1510 presents the message as a message on message board 1526, such as message 1522*a*.

At block 1714, interactive display system 1510 transmits message data to user device 150. In an embodiment, when there is an existing message at or nearby message board location 1524, user 102 may select view/edit message button 1608 or download message button 1610 of message screen 1600 on user device 150. Interactive display system 910 transmits message data for messages at or nearby message board location 1524, such as message 1522*a*.

At block 1716, a message corresponding to message 1522*a* is presented on user device 150. In various embodiments, a message corresponding to message 1522*a* may be presented in message entry/display area 1604 of message screen 1600 on user device 150. In an embodiment, if user 102 selected view/edit message button 1608 at block 1714, user 102 may edit message in message entry/display area 1604 and select post message 1606 to post the edited message. Interactive display system 1510 may receive message data for the edited message from user device 150 and post the edited message as described at block 1710 and 1712.

In another embodiment, if user 102 selected download message button 1610 at block 1714, message data for message 1522*a* may be stored on user device 150. In further embodiments, user 102 may select button 1612 to receive updates for message 1522*a* stored on user device 150. Interactive display system 1510 may transmit data for updated messages to user device 150 via network 170.

Figure 18:
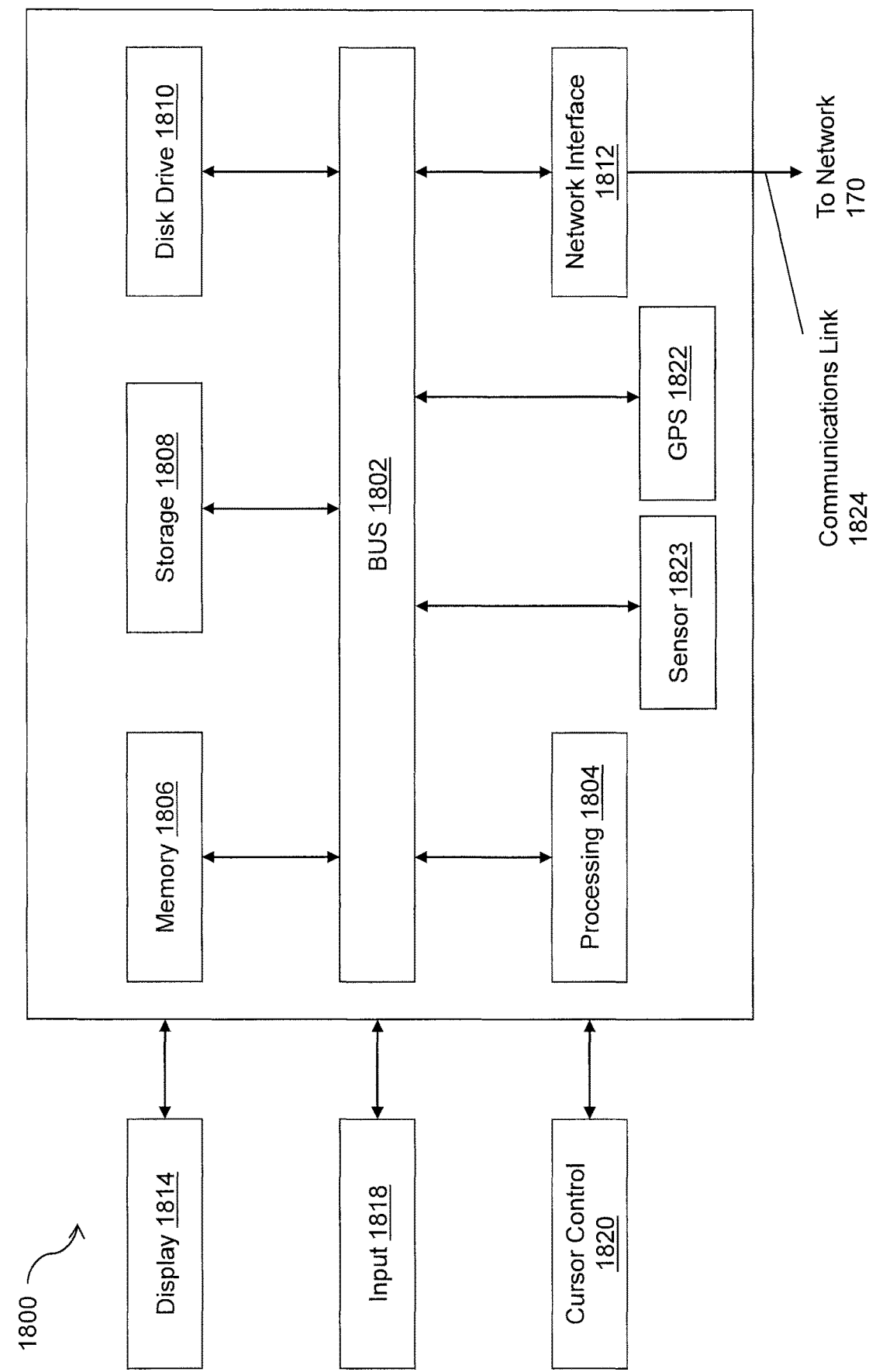
FIG. 18 is a block diagram of a system for implementing one or more components in FIGS. 1 and/or 3 according to an embodiment of the present disclosure.

Referring now to FIG. 18, an embodiment of a computer system 1800 suitable for implementing, for example, the interactive display system, user device, service provider server, and merchant server is illustrated. It should be appreciated that other devices utilized by users, service providers, and/or merchants in the system discussed above may be implemented as computer system 1800 in a manner as follows.

In accordance with various embodiments of the present disclosure, computer system 1800, such as a computer and/or a network server, includes a bus 1802 or other communication mechanism for communicating information, which interconnects subsystems and components, such as a processing component 1804 (e.g., processor, micro-controller, digital signal processor (DSP), etc.), a system memory component 1806 (e.g., RAM), a static storage component 1808 (e.g., ROM), a disk drive component 1810 (e.g., magnetic or optical), a network interface component 1812 (e.g., modem or Ethernet card), a display component 1814 (e.g., light-emitting diode (LED) display component, organic light-emitting diode (OLED) component, liquid-crystal (LCD) display component, plasma display panel (PDP), cathode ray tube (CRT) display component, or other display component), an input component 1818 (e.g., keyboard, keypad, virtual keyboard, touchscreen, etc.), a cursor control component 1820 (e.g., mouse, pointer, trackball, etc.), a location determination component 1822 (e.g., a Global Positioning System (GPS) device as illustrated, a cell tower triangulation device, and/or a variety of other location determination devices known in the art), and/or a sensor component 1823. In one implementation, disk drive component 1810 may include a database having one or more disk drive components.

In accordance with embodiments of the present disclosure, computer system 1800 performs specific operations by processor 1804 executing one or more sequences of instructions contained in memory component 1806, such as described herein with respect to the interactive display system, user device, service provider server, and merchant server. Such instructions may be read into system memory component 1806 from another computer readable medium, such as static storage component 1808 or disk drive component 1810. In other embodiments, hard-wired circuitry may be used in place of or in combination with software instructions to implement the present disclosure.

Logic may be encoded in a computer readable medium, which may refer to any medium that participates in providing instructions to processor 1804 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 1810, volatile media includes dynamic memory, such as system memory component 1806, and transmission media includes coaxial cables, copper wire, and fiber optics, including wires that comprise bus 1802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 1800. In various other embodiments of the present disclosure, a plurality of computer systems 1800 coupled by a communication link 1824 to the network 170 (e.g., such as a LAN, WLAN, PTSN, and/or various other wired or wireless networks, including telecommunications, mobile, and cellular phone networks) may perform instruction sequences to practice the present disclosure in coordination with one another.

Computer system 1800 may transmit and receive messages, data, information and instructions, including one or more programs (i.e., application code) through communication link 1824 and network interface component 1812. Network interface component 1812 may include an antenna, either separate or integrated, to enable transmission and reception via communication link 1824. Received program code may be executed by processor 1804 as received and/or stored in disk drive component 1810 or some other non-volatile storage component for execution.

In view of the present disclosure, it will be appreciated that various devices, systems, and methods have been described according to one or more embodiments for providing interaction between a user device and an interactive display system using near field communications.

Although various components and steps have been described herein as being associated with interactive display system 110, display device 140, one or more user devices 150, service provider server 380, merchant server 390 of FIGS. 1 and/or 3, it is contemplated that the various aspects of such devices and servers illustrated in FIGS. 1 and/or 3 may be distributed among a plurality of servers, devices, and/or other entities.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An interactive display system, comprising:
   a display panel;
   a plurality of near field communication (NFC) devices located behind or within the display panel;
   a non-transitory memory; and
   one or more hardware processors coupled to the non-transitory memory and configured to read instructions from the non-transitory memory to cause the interactive display system to perform operations comprising:
      presenting, on the display panel, a plurality of content corresponding to a plurality of areas on the display panel;
      detecting a user device within a first distance from the display panel using at least one of the plurality of NFC devices;
      determining a position of the user device relative to the display panel based on a location of the at least one of the plurality of NFC devices;
      determining, from the plurality of areas on the display panel, a particular area for interacting with the user device based on the position of the user device relative to the display panel; and
      facilitating an interaction between the particular area of the display panel and the user device by:
         transmitting first content of the plurality of content corresponding to the particular area of the display panel to the user device;
         causing the user device to present a user interface configured to receive data from a user of the user device;
         receiving, from the user device through the user interface, the data;
         detecting a gesture of the user device relative to the display panel;
         authenticating the user based on the gesture of the user device relative to the display panel and the data received through the user interface;
         in response to authenticating the user, updating the first content based on the received data; and
         presenting the updated first content in the particular area of the display panel without modifying the content presented in other areas of the plurality of areas on the display panel.

2. The interactive display system of claim 1, wherein the plurality of NFC devices comprises an array of NFC devices arranged in rows and columns.

3. The interactive display system of claim 1, wherein the operations further comprise:
   detecting a second user device within a second distance from the display panel using the at least one of the plurality of NFC devices or another one of the plurality of NFC devices;
   determining a second position of the second user device relative to the display panel based on which of the plurality of NFC devices detected the second user device;
   determining, from the plurality of areas on the display panel, a second area for interacting with the second user device based on the second position of the second user device relative to the display panel; and
   facilitating interactions between the second area of the display panel and the second user device.

4. The interactive display system of claim 3, wherein the facilitating the interactions between the second area of the display panel and the second user device comprises:
   causing the second user device to present a second user interface configured to receive second data from a second user of the second user device;
   receiving the second data from the second user device through the second user interface;
   authenticating the second user based on the second position of the second user device relative to the display panel and the second data received through the second user interface;
   in response to authenticating the user, modifying second content of the plurality of content corresponding to the second area of the display panel; and
   presenting the modified second content in the second area of the display panel.

5. The interactive display system of claim 1, wherein the display panel comprises a message board, and wherein the updated first content displayed in the particular area of the display panel comprises a message intended for the user.

6. The interactive display system of claim 1, wherein the operations further comprise:
   providing a notification in the particular area of the display panel indicating that the user has been authenticated.

7. The interactive display system of claim 1, wherein the plurality of content comprises one or more items, and wherein the operations further comprise:
   determining a corresponding item based on the determined position;
   accessing payment data associated with the user in response to authenticating the user;
   performing a payment transaction for purchasing the corresponding item based on the payment data; and
   presenting a notification on the particular area of the display panel indicating that the payment transaction has been processed.

8. The interactive display system of claim 7, wherein the first content further comprises purchase information for purchasing the corresponding item.

9. The interactive display system of claim 1, wherein the plurality of content comprises map data corresponding to a plurality of physical locations, and wherein the operations further comprise:
in response to authenticating the user, communicating a portion of the map data to the user device, wherein the portion of the map data comprises information relating to a physical location and directions from a current location of the user device to the physical location.

10. A method, comprising:
presenting, by one or more hardware processors, visual content on a display panel, wherein the display panel is divided into a plurality of areas;
detecting, by the one or more hardware processors using at least one of a plurality of NFC devices, a user device within a first distance from the display panel;
determining, by the one or more hardware processors in response to the detecting, a position of the user device relative to the display panel based on a location of the at least one of the plurality of NFC devices;
determining, by the one or more hardware processors from the plurality of areas of the display panel, a particular area for interacting with the user device based on the determined position of the user device;
facilitating, by the one or more hardware processors, an interaction between the particular area of the display panel and the user device by:
transmitting, by the one or more hardware processors, a first portion of the visual content corresponding to the particular area of the display panel to the user device;
causing, by the one or more hardware processors, the user device to present a user interface configured to receive authentication data from a user of the user device;
receiving, by the one or more hardware processors from the user device through the user interface, the authenticate data;
detecting a movement of the user device relative to the display panel;
authenticating, by the one or more hardware processors, the user of the user device based on the detected movement of the user device and the received authentication data; and
in response to authenticating the user, (i) modifying, by the one or more hardware processors, the first portion of the visual content based on the received authentication data and (ii) presenting, by the one or more hardware processors on the particular area of the display panel, the modified first portion of the visual content.

11. The method of claim 10, wherein the plurality of NFC devices are behind or within the display panel, and wherein the plurality of NFC devices comprise an array of NFC devices arranged in rows and columns.

12. The method of claim 10, wherein the modified first portion of the visual content comprises account data associated with a user account.

13. The method of claim 10, further comprising:
detecting, using the at least one of a plurality of NFC devices or another one of the plurality of NFC devices, a second user device within a second distance from the display panel;
determining, in response to the detecting of the second user device, a second position of the second user device relative to the display panel based on which of the plurality of NFC devices detected the second user device;
determining, from the plurality of areas of the display panel, a second area for interacting with the second user device based on the second position of the second user device;
transmitting a second portion of the visual content corresponding to the particular area of the display panel to the second user device;
providing, on the user device, a second user interface configured to receive second authentication data;
receiving the second authentication data from the second user device;
authenticating a second user of the second user device based on the determined position of the second user device and the received second authentication data; and
in response to authenticating the second user, (i) modifying the second portion of the visual content based on the received authentication data and (ii) presenting, on the second area of the display panel, the modified second portion of the visual content.

14. The method of claim 10, wherein the visual content comprises identifiers corresponding to a plurality of users, and wherein the position of the user device relative to the display panel corresponds to an identifier of the user.

15. The method of claim 10, wherein the first portion of the visual content comprises data associated with the user.

16. The method of claim 10, wherein the visual content comprises item data associated with one or more items, the method further comprising:
determining a corresponding item from the one or more items based on the determined position of the user device; and
in response to authenticating the user, performing a payment transaction for purchasing the corresponding item based on the authentication data received from the user device.

17. The method of claim 16, further comprising:
causing the user device to display a portion of the item data corresponding to the particular area and an option to purchase the corresponding item; and
receiving, via the at least one of the plurality of NFC devices, a purchase request for purchasing the corresponding item from the user device.

18. The method of claim 10, wherein the visual content comprises location data associated with a map, wherein the plurality of areas on the display panel corresponds to different map locations on the map, the method further comprising:
determining a corresponding map location representing a physical location based on the determine position of the user device;
transmitting, using the at least one of the plurality of NFC devices, a portion of the location data associated with the corresponding map location to the user device, wherein the portion of the location data comprises information relating to the physical location and directions from a current location of the user device to the physical location; and
causing the user device to display the portion of the location data.

19. A non-transitory machine-readable medium having stored thereon machine-readable instructions executable to cause a machine to perform operations comprising:

presenting, on a display panel, a plurality of content corresponding to a plurality of areas on the display panel;

detecting a user device within a first distance from the display panel using at least one of a plurality of near field communication (NFC) devices;

determining a position of the user device relative to the display panel based on which of the plurality of NFC devices detected the user device;

determining, from the plurality of areas on the display panel, a particular area for interacting with the user device based on the position of the user device relative to the display panel; and facilitating an interaction between the particular area of the display panel and the user device by:

transmitting first content of the plurality of content corresponding to the particular area of the display panel to the user device;

causing the user device to present a user interface configured to receive data from a user of the user device;

receiving, from the user device through the user interface, the data;

detecting a gesture of the user device relative to the display panel;

authenticating the user based on the gesture of the user device relative to the display panel and the data received through the user interface;

in response to authenticating the user, updating the first content based on the received data; and presenting the updated first content in the particular area of the display panel without modifying the content presented in other areas of the plurality of areas on the display panel.

20. The non-transitory machine-readable medium of claim 19, wherein the operations further comprise:

detecting a second user device within a second distance from the display panel using the at least one of the plurality of NFC devices or another one of the plurality of NFC devices;

determining a second position of the second user device relative to the display panel based on which of the plurality of NFC devices detected the second user device;

determining, from the plurality of areas on the display panel, a second area for interacting with the second user device based on the second position of the second user device relative to the display panel; and facilitating interactions between the second area of the display panel and the second user device.

\* \* \* \* \*